US011250697B2

(12) United States Patent
Vig et al.

(10) Patent No.: US 11,250,697 B2
(45) Date of Patent: Feb. 15, 2022

(54) MISSING TRAFFIC FACE DETECTOR

(71) Applicant: UATC, LLC, San Francisco, CA (US)

(72) Inventors: Sean David Vig, Pittsburgh, PA (US); Shivali Anil Chandra, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 109 days.

(21) Appl. No.: 16/727,680

(22) Filed: Dec. 26, 2019

(65) Prior Publication Data

US 2020/0211375 A1 Jul. 2, 2020

Related U.S. Application Data

(60) Provisional application No. 62/785,034, filed on Dec. 26, 2018.

(51) Int. Cl.

| G08G 1/01 | (2006.01) |
|---|---|
| G06F 16/29 | (2019.01) |
| G08G 1/0967 | (2006.01) |
| G06K 9/00 | (2006.01) |

(52) U.S. Cl.
CPC ........... *G08G 1/0141* (2013.01); *G06F 16/29* (2019.01); *G06K 9/00818* (2013.01); *G06K 9/00825* (2013.01); *G08G 1/0112* (2013.01); *G08G 1/0129* (2013.01); *G08G 1/096716* (2013.01)

(58) Field of Classification Search
CPC .... G08G 1/0141; G08G 16/29; G08G 1/0112; G08G 1/0129; G08G 1/096716

USPC .......................................................... 701/52
See application file for complete search history.

(56) References Cited

U.S. PATENT DOCUMENTS

| 2007/0050129 A1* | 3/2007 | Salmre ................. G09B 29/106 |
| | | 701/408 |
| 2020/0189563 A1* | 6/2020 | Sakai ..................... G05D 1/027 |
| 2020/0193195 A1* | 6/2020 | Doria .................. G06K 9/00798 |
| 2020/0225681 A1* | 7/2020 | Stein ..................... G05D 1/0088 |
| 2021/0027076 A1* | 1/2021 | Hayashi ................... G08G 1/04 |

* cited by examiner

*Primary Examiner* — Emily C Terrell
(74) *Attorney, Agent, or Firm* — Schwegman Lundberg & Woessner, P.A.

(57) ABSTRACT

Systems, devices, products, apparatuses, and/or methods, for detecting a missing traffic face, including: obtaining sensor data that includes a plurality of images associated with a geographic location including a roadway and associated with a plurality of image capture locations in the geographic location, determining in a subset of images of the plurality of images, a plurality of image areas associated with at least one predicted traffic face, determining a plurality of rays that project through 3-D spaces of the geographic location associated with the plurality of image areas from a subset of image capture locations of the plurality of image capture locations associated with the subset of images, and identifying at least one location of a traffic face in the geographic location based on a sum of unit vectors of the plurality of rays that project through the 3-D spaces of the geographic location at the at least one location of the traffic face.

20 Claims, 9 Drawing Sheets

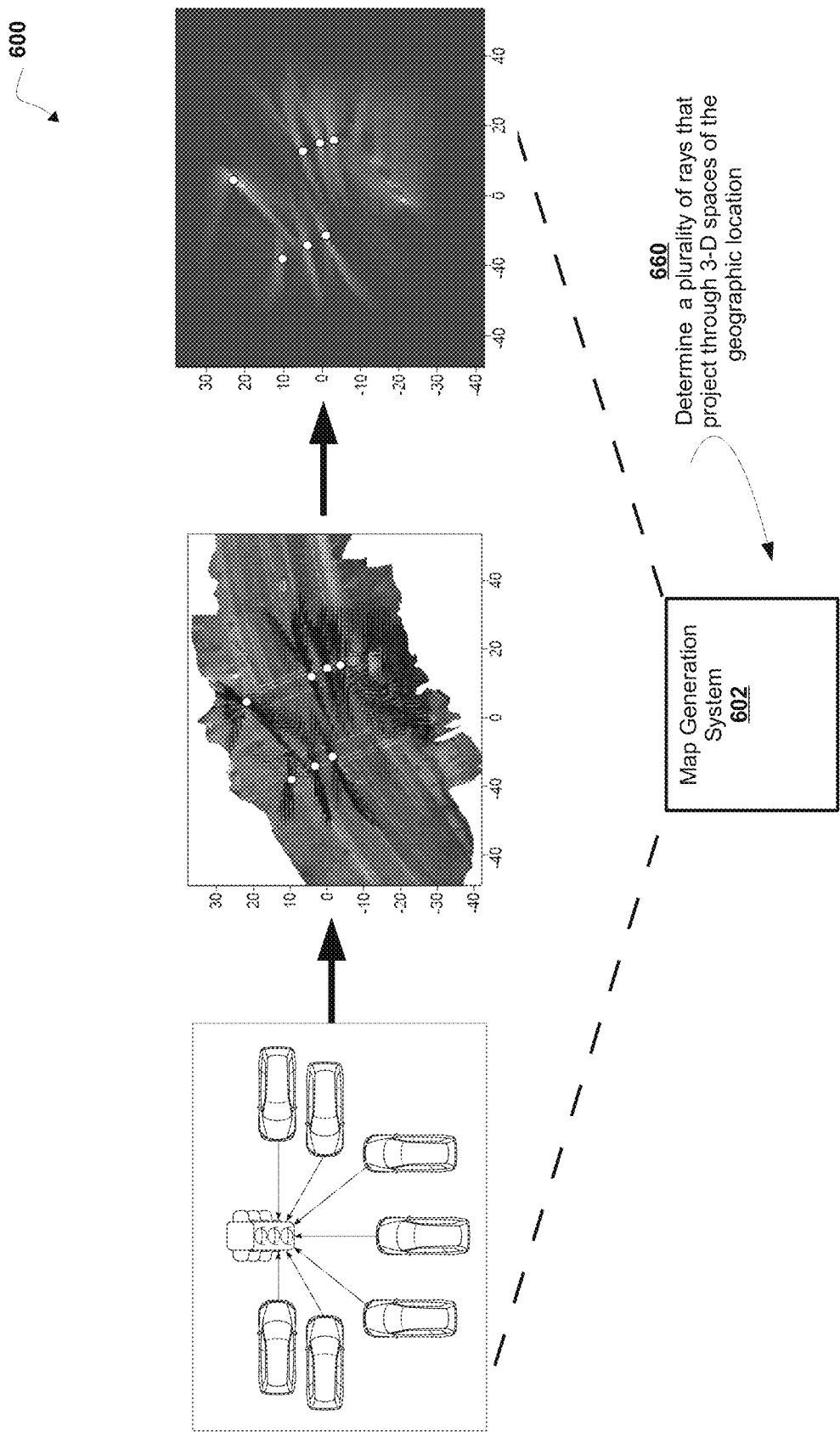

MISSING TRAFFIC FACE DETECTOR

CROSS REFERENCE TO RELATED APPLICATIONS

This application claims the benefit of U.S. Provisional Application No. 62/785,034, filed Dec. 26, 2018, the entire disclosure of which is hereby incorporated by reference in its entirety.

BACKGROUND

An autonomous vehicle (e.g., a driverless car, a driverless auto, a self-driving car, a robotic car, etc.) is a vehicle that is capable of sensing an environment of the vehicle and traveling (e.g., navigating, moving, etc.) in the environment without human input. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant traffic faces associated with a route.

SUMMARY

Accordingly, disclosed are systems, devices, products, apparatuses, and/or methods for detecting a missing traffic face in a roadway.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

Provided are systems, devices, products, apparatuses, and/or methods for detecting missing traffic faces in a roadway, identifying a location of a traffic face in a geographic location, improving generation of autonomous vehicle maps for an autonomous vehicle by detecting a location of a traffic face in a geographical location, and improving control of travel of an autonomous vehicle by detecting traffic faces in a roadway, and/or the like. According to some non-limiting embodiments or aspects, provided is a method, comprising: obtaining, with a computing system comprising one or more processors, sensor data, wherein the sensor data includes a plurality of images associated with a geographic location including a roadway, and wherein the plurality of images are associated with a plurality of image capture locations in the geographic location; determining, with the computing system, in a subset of images of the plurality of images, a plurality of image areas associated with at least one predicted traffic face; determining, with the computing system, a plurality of rays that project through 3-D spaces of the geographic location associated with the plurality of image areas from a subset of image capture locations of the plurality of image capture locations associated with the subset of images; and identifying, with the computing system, at least one location of a traffic face in the geographic location based on a sum of unit vectors of the plurality of rays that project through the 3-D spaces of the geographic location at the at least one location of the traffic face.

In some non-limiting embodiments or aspects, the method further includes receiving map data associated with a map of the geographic location including a plurality of mapped traffic faces; and determining a plurality of map areas of the geographic location including at least one mapped traffic face of the plurality of mapped traffic faces.

In some non-limiting embodiments or aspects, the method further includes validating the at least one location of the traffic face by verifying at least one map area of the plurality of map areas includes the at least one location of the traffic face; or determining the plurality of map areas does not include the at least one location of the traffic face, and generating map data associated with the at least one location of the traffic face to identify a map area of the traffic face.

In some non-limiting embodiments or aspects, the method further includes generating, with the computing system, a 2-D space of the at least one location of the traffic face in the geographic location based on maximizing a magnitude of the sum of the unit vectors of the plurality of rays that project through the 3-D spaces at the at least one location of the traffic face in a z-direction.

In some non-limiting embodiments or aspects, generating the map data of the map further comprises: determining a height and an orientation associated with the at least one location of the traffic face, wherein the height is calculated to be within a predetermined threshold of a maximum discrepancy associated with the map data, and wherein the orientation is calculated to be within a predetermined threshold of a traffic face orientation associated with the map data.

In some non-limiting embodiments or aspects, the method further includes providing a region of the map area as a selectable factor in the map for indicating a probable location of the traffic face.

In some non-limiting embodiments or aspects, identifying the at least one location of the traffic face further comprises: determining the at least one location of the traffic face from a plurality of locations of a plurality of traffic faces satisfying a threshold value associated with the sum of unit vectors of the plurality of rays that project through the 3-D spaces of the geographic location at the at least one location.

In some non-limiting embodiments or aspects, wherein the plurality of rays that project through 3-D spaces of the geographic location associated with the plurality of image areas includes a field of voxels in the geographic location, wherein at least one ray of the plurality of rays that project through 3-D spaces of the geographic location associated with an image area of the plurality of image areas intersects with a plurality of voxels of the field of voxels in the geographic location from an image capture location of the subset of image capture locations associated with the subset of images.

According to some non-limiting embodiments or aspects, provided is a computing system that includes one or more processors programmed and/or configured to: obtain sensor data, wherein the sensor data includes a plurality of images associated with a geographic location including a roadway, and wherein the plurality of images are associated with a plurality of image capture locations in the geographic location; determine, in a subset of images of the plurality of images, a plurality of image areas associated with at least one predicted traffic face; determine a plurality of rays that project through 3-D spaces of the geographic location associated with the plurality of image areas from a subset of image capture locations of the plurality of image capture locations associated with the subset of images; and identify at least one location of a traffic face in the geographic location based on a sum of unit vectors of the plurality of rays that project through the 3-D spaces of the geographic location at the at least one location the traffic face.

In some non-limiting embodiments or aspects, the one or more processors are further programmed and/or configured to: receive map data associated with a map of the geographic location including a plurality of mapped traffic faces; and determine a plurality of map areas of the geographic location including at least one mapped traffic face of the plurality of mapped traffic faces.

In some non-limiting embodiments or aspects, the one or more processors are further programmed and/or configured to: validate the at least one location of the traffic face by verifying at least one map area of the plurality of map areas includes the at least one location of the traffic face; or determine the plurality of map areas does not include the at least one location of the traffic face, and generate map data associated with the at least one location of the traffic face to identify a map area of the traffic face.

In some non-limiting embodiments or aspects, the one or more processors are further programmed and/or configured to: generate a 2-D space of the at least one location of the traffic face in the geographic location based on maximizing a magnitude of the sum of the unit vectors of the plurality of rays that project through the 3-D spaces at the at least one location of the traffic face in a z-direction.

In some non-limiting embodiments or aspects, the one or more processors are further programmed and/or configured to: determine a height and an orientation associated with the at least one location of the traffic face, wherein the height is calculated to be within a predetermined threshold of a maximum discrepancy associated with the map data, and wherein the orientation is calculated to be within a predetermined threshold of a traffic face orientation associated with the map data.

In some non-limiting embodiments or aspects, the one or more processors are further programmed and/or configured to: provide a region of the map area as a selectable factor in the map for indicating a probable location of the traffic face.

In some non-limiting embodiments or aspects, the one or more processors are further programmed and/or configured to: determine the at least one location of the traffic face from a plurality of locations of a plurality of traffic faces satisfying a threshold value associated with the sum of unit vectors of the plurality of rays that project through the 3-D spaces of the geographic location at the at least one location of the traffic face.

In some non-limiting embodiments or aspects, the plurality of rays that project through 3-D spaces of the geographic location associated with the plurality of image areas includes a field of voxels in the geographic location, wherein at least one ray of the plurality of rays that project through 3-D spaces of the geographic location associated with an image area of the plurality of image areas intersects with a plurality of voxels of the field of voxels in the geographic location from an image capture location of the subset of image capture locations associated with the subset of images.

According to some non-limiting embodiments or aspects, provided is a computer program product comprising at least one non-transitory computer-readable medium including program instructions that, when executed by at least one processor, cause the at least one processor to: obtain sensor data, wherein the sensor data includes a plurality of images associated with a geographic location including a roadway, and wherein the plurality of images are associated with a plurality of image capture locations in the geographic location; determine in a subset of images of the plurality of images, a plurality of image areas associated with at least one predicted traffic face; determine a plurality of rays that project through 3-D spaces of the geographic location associated with the plurality of image areas from a subset of image capture locations of the plurality of image capture locations associated with the subset of images; and identify at least one location of a traffic face in the geographic location based on a sum of unit vectors of the plurality of rays that project through the 3-D spaces of the geographic location at the at least one location of the traffic face.

In some non-limiting embodiments or aspects, the one or more instructions further cause the at least one processor to: receive map data associated with a map of the geographic location including a plurality of mapped traffic faces; and determine a plurality of map areas of the geographic location including at least one mapped traffic face of the plurality of mapped traffic faces.

In some non-limiting embodiments or aspects, the one or more instructions further cause the at least one processor to verify the at least one map area by: validating the at least one location of the traffic face by verifying at least one map area of the plurality of map areas includes the at least one location of the traffic face; or determining the plurality of map areas does not include the at least one location of the traffic face, and generating map data associated with the at least one location of the traffic face for identifying a map area of the traffic face.

According to some non-limiting embodiments or aspects, the one or more instructions further cause the at least one processor to: determine a height and an orientation associated with the at least one location of the traffic face, wherein the height is calculated to be within a predetermined threshold of a maximum discrepancy associated with the map data, and wherein the orientation is calculated to be within a predetermined threshold of a traffic face orientation associated with the map data.

Further non-limiting embodiments or aspects are set forth in the following numbered clauses:

Clause 1: A computer-implemented method comprising: obtaining, with a computing system comprising one or more processors, sensor data, wherein the sensor data includes a plurality of images associated with a geographic location including a roadway, and wherein the plurality of images are associated with a plurality of image capture locations in the geographic location; determining, with the computing system, in a subset of images of the plurality of images, a plurality of image areas associated with at least one predicted traffic face; determining, with the computing system, a plurality of rays that project through 3-D spaces of the geographic location associated with the plurality of image areas from a subset of image capture locations of the plurality of image capture locations associated with the subset of images; and identifying, with the computing system, at least one location of a traffic face in the geographic location based on a sum of unit vectors of the plurality of rays that project through the 3-D spaces of the geographic location at the at least one location of the traffic face.

Clause 2: The computer-implemented method of clause 1, further comprising: receiving map data associated with a map of the geographic location including a plurality of mapped traffic faces; and determining a plurality of map areas of the geographic location including at least one mapped traffic face of the plurality of mapped traffic faces.

Clause 3: The computer-implemented method of any of clauses 1 or 2, further comprising: validating the at least one location of the traffic face by verifying at least one map area of the plurality of map areas includes the at least one location of the traffic face; or determining the plurality of map areas does not include the at least one location of the traffic face, and generating map data associated with the at least one location of the traffic face to identify a map area of the traffic face.

Clause 4: The computer-implemented method of any of clauses 1-3, further comprising: generating, with the computing system, a 2-D space of the at least one location of the traffic face in the geographic location based on maximizing a magnitude of the sum of the unit vectors of the plurality of rays that project through the 3-D spaces at the at least one location of the traffic face in a z-direction.

Clause 5: The computer-implemented method of any of clauses 1-4, wherein generating the map data of the map further comprises: determining a height and an orientation associated with the at least one location of the traffic face, wherein the height is calculated to be within a predetermined threshold of a maximum discrepancy associated with the map data, and wherein the orientation is calculated to be within a predetermined threshold of a traffic face orientation associated with the map data.

Clause 6. The computer-implemented method of any of clauses 1-5, further comprising: providing a region of the map area as a selectable factor in the map for indicating a probable location of the traffic face.

Clause 7: The computer-implemented method of any of clauses 1-6, wherein identifying the at least one location of the traffic face further comprises: determining the at least one location of the traffic face from a plurality of locations of a plurality of traffic faces satisfying a threshold value associated with the sum of unit vectors of the plurality of rays that project through the 3-D spaces of the geographic location at the at least one location.

Clause 8: The computer-implemented method of any of clauses 1-7, wherein the plurality of rays that project through 3-D spaces of the geographic location associated with the plurality of image areas includes a field of voxels in the geographic location, wherein at least one ray of the plurality of rays that project through 3-D spaces of the geographic location associated with an image area of the plurality of image areas intersects with a plurality of voxels of the field of voxels in the geographic location from an image capture location of the subset of image capture locations associated with the subset of images.

Clause 9: A computing system comprising: one or more processors programmed and/or configured to: obtain sensor data, wherein the sensor data includes a plurality of images associated with a geographic location including a roadway, and wherein the plurality of images are associated with a plurality of image capture locations in the geographic location; determine, in a subset of images of the plurality of images, a plurality of image areas associated with at least one predicted traffic face; determine a plurality of rays that project through 3-D spaces of the geographic location associated with the plurality of image areas from a subset of image capture locations of the plurality of image capture locations associated with the subset of images; and identify at least one location of a traffic face in the geographic location based on a sum of unit vectors of the plurality of rays that project through the 3-D spaces of the geographic location at the at least one location the traffic face.

Clause 10: The computing system of clause 9, wherein the one or more processors are further programmed and/or configured to: receive map data associated with a map of the geographic location including a plurality of mapped traffic faces; and determine a plurality of map areas of the geographic location including at least one mapped traffic face of the plurality of mapped traffic faces.

Clause 11: The computing system of any of clauses 9 or 10, wherein the one or more processors are further programmed and/or configured to: validate the at least one location of the traffic face by verifying at least one map area of the plurality of map areas includes the at least one location of the traffic face; or determine the plurality of map areas does not include the at least one location of the traffic face, and generate map data associated with the at least one location of the traffic face to identify a map area of the traffic face.

Clause 12: The computing system of any of clauses 9-11, wherein the one or more processors are further programmed and/or configured to: generate a 2-D space of the at least one location of the traffic face in the geographic location based on maximizing a magnitude of the sum of the unit vectors of the plurality of rays that project through the 3-D spaces at the at least one location of the traffic face in a z-direction.

Clause 13: The computing system of any of clauses 9-12, wherein the one or more processors are further programmed and/or configured to: determine a height and an orientation associated with the at least one location of the traffic face, wherein the height is calculated to be within a predetermined threshold of a maximum discrepancy associated with the map data, and wherein the orientation is calculated to be within a predetermined threshold of a traffic face orientation associated with the map data.

Clause 14: The computing system of any of clauses 9-13, wherein the one or more processors are further programmed and/or configured to: provide a region of the map area as a selectable factor in the map for indicating a probable location of the traffic face.

Clause 15: The computing system of any of clauses 9-14, wherein the one or more processors are further programmed and/or configured to: determine the at least one location of the traffic face from a plurality of locations of a plurality of traffic faces satisfying a threshold value associated with the sum of unit vectors of the plurality of rays that project through the 3-D spaces of the geographic location at the at least one location of the traffic face.

Clause 16: The computing system of any of clauses 9-15, wherein the plurality of rays that project through 3-D spaces of the geographic location associated with the plurality of image areas includes a field of voxels in the geographic location, wherein at least one ray of the plurality of rays that project through 3-D spaces of the geographic location associated with an image area of the plurality of image areas intersects with a plurality of voxels of the field of voxels in the geographic location from an image capture location of the subset of image capture locations associated with the subset of images.

Clause 17: A computer program product comprising at least one non-transitory computer-readable medium including program instructions that, when executed by at least one processor, cause the at least one processor to: obtain sensor data, wherein the sensor data includes a plurality of images associated with a geographic location including a roadway, and wherein the plurality of images are associated with a plurality of image capture locations in the geographic location; determine in a subset of images of the plurality of images, a plurality of image areas associated with at least one predicted traffic face; determine a plurality of rays that project through 3-D spaces of the geographic location associated with the plurality of image areas from a subset of image capture locations of the plurality of image capture locations associated with the subset of images; and identify at least one location of a traffic face in the geographic location based on a sum of unit vectors of the plurality of rays that project through the 3-D spaces of the geographic location at the at least one location of the traffic face.

Clause 18: The computer program product of clause 17, wherein the one or more instructions further cause the at least one processor to: receive map data associated with a map of the geographic location including a plurality of mapped traffic faces; and determine a plurality of map areas of the geographic location including at least one mapped traffic face of the plurality of mapped traffic faces.

Clause 19: The computer program product of any of clauses 17 or 18, wherein the one or more instructions further cause the at least one processor to verify the at least one map area by: validating the at least one location of the traffic face by verifying at least one map area of the plurality of map areas includes the at least one location of the traffic face; or determining the plurality of map areas does not include the at least one location of the traffic face, and generating map data associated with the at least one location of the traffic face for identifying a map area of the traffic face.

Clause 20: The computer program product of any of clauses 17-19, wherein the one or more instructions further cause the at least one processor to: determine a height and an orientation associated with the at least one location of the traffic face, wherein the height is calculated to be within a predetermined threshold of a maximum discrepancy associated with the map data, and wherein the orientation is calculated to be within a predetermined threshold of a traffic face orientation associated with the map data.

BRIEF DESCRIPTION OF THE DRAWINGS

FIGS. 6A-6D are diagrams of an implementation of one or more processes disclosed herein.

DETAILED DESCRIPTION

Figure 1:
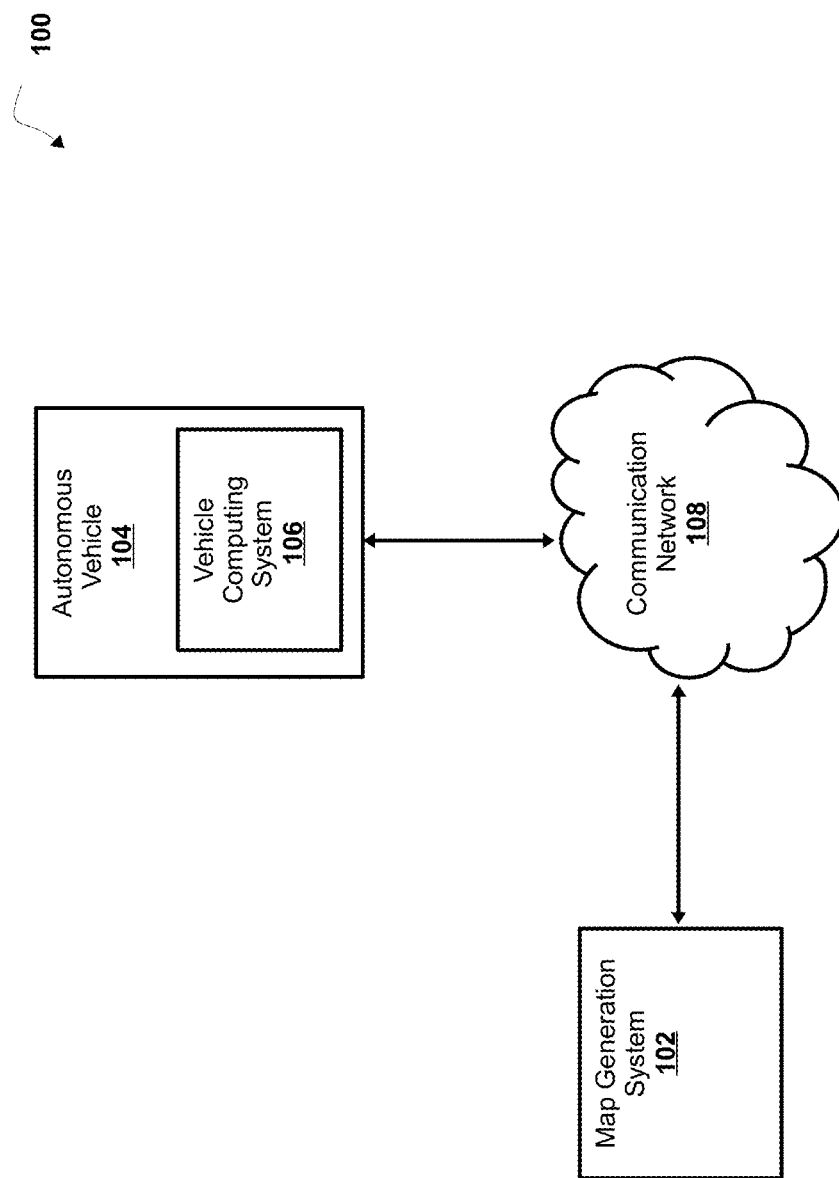
FIG. 1 is a diagram of a non-limiting embodiment or aspect of an environment in which systems, devices, products, apparatuses, and/or methods, described herein, can be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like, are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUI) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment, may constitute a "system" or a "computing system".

It will be apparent that the systems and/or methods described herein can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

An autonomous vehicle ("AV") map includes information associated with a roadway, such as a location and/or orientation of a traffic face (e.g., a traffic signal, a traffic light, etc.) relative to the roadway. An AV may traverse a roadway, including one or more traffic faces, based on an AV map including one or more traffic faces in a geographic location including the roadway. For safety and efficiency, an AV map includes precise identifying and labeling of traffic faces (e.g., marking of a traffic face boundary, positioning of a traffic face, orientation of a traffic face with respect to a road, location parameters of a traffic face, etc.). For example, the AV (e.g., a vehicle computing system of the AV, etc.) uses map data based on the AV map to determine vehicle maneuvers based on objects (e.g., traffic faces, etc.) in the AV map of the geographic location including the roadway. An AV map may be produced manually, by a human operator identifying and labeling traffic faces in an image of the geographic location including the roadway.

However, images of the geographic location including the roadway may not provide traffic face information or may not provide sufficient traffic face information to accurately determine a traffic face in a roadway, and/or such manually produced AV maps may not sufficiently verify, identify, and/or label traffic faces in a geographic location based on the images. For example, misplaced traffic lights can occur due to triangulation errors in an image, when a localization of a map lacks precision, when a localization of a map log changes (e.g., when updating or adding the AV maps, etc.) and the traffic light positions are not updated, and/or when the images do not capture or cover a sufficient field of view (e.g., do not include enough angle images, do not provide enough views, etc.) to include each of the lights at a given intersection or roadway. As an example, missing traffic faces (e.g., traffic faces missing from a map, traffic faces that are not properly located, traffic faces that have been moved in the real world, traffic faces not oriented properly, etc.) may occur in roads where the lanes are wide and, as a result, a sufficient view (e.g., in a traffic camera, etc.) of a traffic face of an intersection and/or roadway may not be available. For example, traffic faces on an edge of a frame (e.g., a traffic face including a left turn arrow on a far left of an intersection, etc.) may be obscured from view, causing it to be difficult to identify and/or to be missed entirely. In such an example, missing or improperly mapped traffic faces may not provide viable information for use by an AV and/or may require additional manual adjustments to become viable for use by the AV. Automated models suffer many of the same inefficiencies and/or inaccuracies as manually produced AV maps, such as not detecting traffic faces, over detecting (e.g., improperly identifying objects as traffic faces), and/or including improper and/or inaccurate identifying or labeling of images containing false positive predictions (e.g., windows, reflections of traffic lights, banners, etc.).

Existing computer systems have no mechanism to determine, identify, and detect missing and/or improperly labeled traffic faces in a map of a geographic location. Further, existing computer systems have no mechanism for using sensor data associated with one or more previous traversals of a roadway by one or more vehicles to determine a traffic face in a geographic location including the roadway. Accordingly, existing computer systems may not determine traffic faces in a map that accurately represent traffic faces in a geographic location and/or may not accurately detect one or more traffic faces missing from an AV map.

Non-limiting embodiments or aspects of the present disclosure are directed to systems, devices, products, apparatuses, and/or methods for determining traffic faces based on sensor data associated with one or more previous traversals of a roadway by one or more vehicles and/or detecting missing traffic faces in an AV map. For example, a method may include obtaining sensor data, wherein the sensor data includes a plurality of images associated with a geographic location including a roadway, where the plurality of images is associated with a plurality of image capture locations in the geographic location; determining, in a subset of images of the plurality of images, a plurality of image areas associated with at least one predicted traffic face; determining a plurality of rays that project through 3-D spaces of the geographic location associated with the plurality of image areas from a subset of image capture locations of the plurality of image capture locations associated with the subset of images; and identifying at least one location of at least one traffic face in the geographic location based on a sum of unit vectors of the plurality of rays that project through the 3-D spaces of the geographic location at the at least one location. In this way, rather than detecting individual traffic faces in an image, predicted traffic face areas that are detected across a plurality of images can be aggregated together with rays projected into the 3-D space of the geographic location through the predicted traffic faces, which enables a traffic face in a geographic location to be determined, identified, and/or labeled more accurately, a traffic face in a map to be verified more efficiently, and/or provides more accurate traffic face information, by which missing or improperly mapped traffic faces may be located, determined, corrected and/or adjusted in a map. Accordingly, challenging roadways (e.g., roadways with potentially obscured traffic faces, etc.) may be more accurately and/or efficiently mapped and/or verified for traffic faces and problems associated with (i) over detecting, (ii) improper and/or inaccurate identifying, and/or (iii) labeling of images containing false positive predictions can be reduced or prevented.

Referring now to FIG. 1, FIG. 1 is a diagram of an example environment 100 in which devices, systems, methods, and/or products described herein, may be implemented. As shown in FIG. 1, environment 100 includes map generation system 102, autonomous vehicle 104 including vehicle computing system 106, and communication network 108. Systems and/or devices of environment 100 can interconnect via wired connections, wireless connections, or a combination of wired and wireless connections.

In some non-limiting embodiments or aspects, map generation system 102 includes one or more devices capable of obtaining sensor data, wherein the sensor data includes a plurality of images associated with a geographic location including a roadway where the plurality of images are associated with a plurality of image capture locations in the geographic area, determining, in a subset of images of the plurality of images, a plurality of image areas associated with at least one predicted traffic face, and determining a plurality of rays that project through 3-D spaces of the geographic location associated with the plurality of image areas from a subset of image capture locations of the plurality of image capture locations associated with the subset of images; and identifying at least one location of at least one traffic face in the geographic area based on a sum of unit vectors of the plurality of rays that project through the 3-D spaces of the geographic location at the at least one location of a traffic face. For example, map generation system 102 can include one or more computing systems including one or more processors (e.g., one or more servers, etc.).

In some non-limiting embodiments or aspects, autonomous vehicle 104 (e.g., vehicle computing system 106, etc.) includes one or more devices capable of obtaining sensor data associated with a detected object in an environment surrounding autonomous vehicle 104. For example, autonomous vehicle 104 can include one or more computing systems including one or more processors (e.g., one or more servers, etc.) and one or more devices capable of obtaining sensor data (e.g., one or more wide angle cameras, LIDAR, RADAR, etc.). As an example, autonomous vehicle 104 (e.g., vehicle computing system 106, etc.) includes one or more devices capable of obtaining sensor data associated with a plurality of images in an environment surrounding autonomous vehicle 104 while controlling travel, operation, and/or routing of autonomous vehicle 104 based on map data, feature data, position data, state data, sensor data, motion data, test data, and/or the like. In such an example, the one or more devices may obtain sensor data associated with detecting images including a traffic face in an environment surrounding autonomous vehicle 104 while controlling travel and one or more functionalities associated with a fully autonomous mode of autonomous vehicle 104 based on the map data, feature data, position data, state data, sensor data, motion data, and/or the like. Further details regarding non-limiting embodiments of autonomous vehicle 104 are provided below with regard to FIG. 2.

In some non-limiting embodiments or aspects, map generation system 102 and/or autonomous vehicle 104 include one or more devices capable of receiving, storing, and/or providing map data (e.g., map data, AV map data, coverage map data, hybrid map data, submap data, Uber's Hexagonal Hierarchical Spatial Index (H3) data, Google's S2 geometry data, etc.) associated with a map (e.g., a map, a submap, an AV map, a coverage map, a hybrid map, a H3 cell, a S2 cell, etc.) at a geographic location (e.g., a country, a state, a city, a portion of a city, a township, a portion of a township, etc.). For example, maps can be used for routing autonomous vehicle 104 on a roadway specified in the map.

In some non-limiting embodiments or aspects, a road refers to a paved or otherwise improved path between two places that allows for travel by a vehicle (e.g., autonomous vehicle 104, etc.). Additionally or alternatively, a road includes a roadway and a sidewalk in proximity to (e.g., adjacent, near, next to, touching, etc.) the roadway. In some non-limiting embodiments or aspects, a roadway includes a portion of road on which a vehicle is intended to travel and is not restricted by a physical barrier or a separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments or aspects, a roadway is connected to another roadway, for example, a lane of a roadway is connected to another lane of the roadway and/or a lane of the roadway is connected to a lane of another roadway.

In some non-limiting embodiments or aspects, a roadway is associated with map data that defines one or more attributes of (e.g., metadata associated with) the roadway (e.g., attributes of a roadway at a geographic location, attributes of a roadway in a geographic area or region, attributes of a segment of a roadway, attributes of a lane of a roadway, attributes of an edge of a roadway, attributes of a driving path of a roadway, etc.). In some non-limiting embodiments or aspects, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), a centerline of a roadway (e.g., an indication of a centerline path in at least one lane of the roadway for controlling autonomous vehicle 104 during operation (e.g., following, traveling, traversing, routing, etc.) on a driving path, a driving path of a roadway (e.g., one or more trajectories that autonomous vehicle 104 can traverse in the roadway and an indication of the location of at least one feature in the roadway a lateral distance from the driving path, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like. In some non-limiting embodiments or aspects, a map of a geographic area includes one or more routes that include one or more roadways. In some non-limiting embodiments or aspects, map data associated with a map of the geographic area associates each roadway of the one or more roadways with an indication of whether an autonomous vehicle 104 can travel on that roadway.

In some non-limiting embodiments or aspects, a driving path includes one or more trajectories for autonomous vehicle 104 on a roadway. For example, a driving path may include feature data associated with features of the roadway (e.g., a section of curb, a marker, an object, etc.) for controlling autonomous vehicle 104 to autonomously determine objects in the roadway and/or feature data associated with lateral regions (e.g., left and right edges of a lane in the roadway, etc.) of the driving path. As an example, a driving path includes a trajectory (e.g., a spline, a polyline, etc.), and a location of features (e.g., a portion of the feature, a section of the feature) in the roadway, with a link for transitioning between an entry point and an end point of the driving path based on at least one of heading information, curvature information, acceleration information and/or the like, and intersections with features in the roadway (e.g., real objects, paint markers, curbs, other lane paths) of a lateral region (e.g., polygon) projecting from the path with objects of interest.

In some non-limiting embodiments or aspects, communication network 108 includes one or more wired and/or wireless networks. For example, communication network 108 includes a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices, and/or networks, fewer systems, devices, and/or networks, different systems, devices, and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
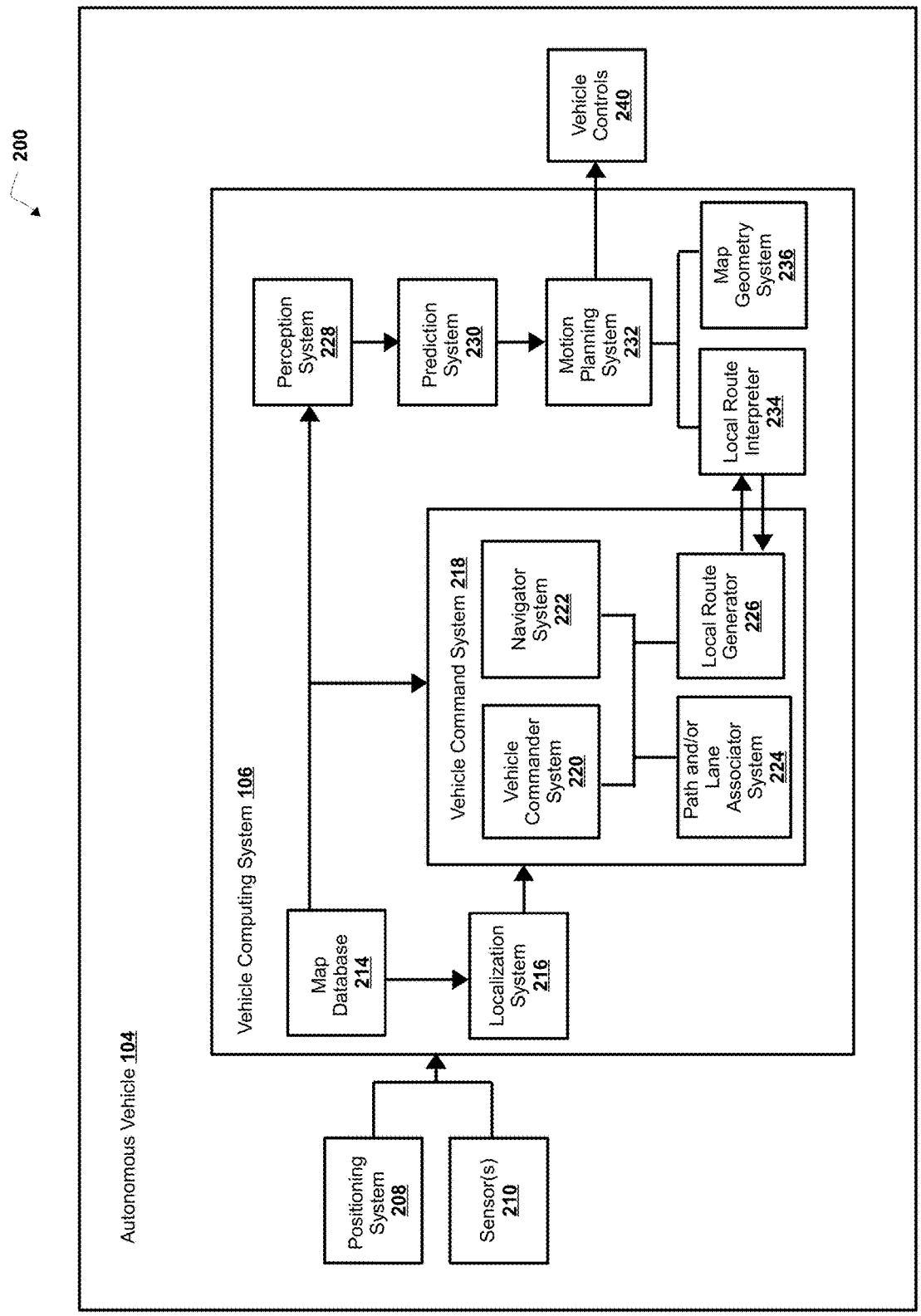
FIG. 2 is a diagram of a non-limiting embodiment or aspect of a system for controlling an autonomous vehicle shown in FIG. 1.

Referring now to FIG. 2, FIG. 2 is a diagram of a non-limiting embodiment or aspect of a system 200 for controlling autonomous vehicle 104. As shown in FIG. 2, vehicle computing system 106 includes vehicle command system 218, perception system 228, prediction system 230, motion planning system 232, local route interpreter 234, and map geometry system 236 that cooperate to perceive a surrounding environment of autonomous vehicle 104, determine a motion plan of autonomous vehicle 104 based on the perceived surrounding environment, and control the motion (e.g., the direction of travel) of autonomous vehicle 104 based on the motion plan.

In some non-limiting embodiments or aspects, vehicle computing system 106 is connected to or includes positioning system 208. In some non-limiting embodiments or aspects, positioning system 208 determines a position (e.g., a current position, a past position, etc.) of autonomous vehicle 104. In some non-limiting embodiments or aspects, positioning system 208 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments or aspects, the position of autonomous vehicle 104 is used by vehicle computing system 106.

In some non-limiting embodiments or aspects, vehicle computing system 106 receives sensor data from one or more sensors 210 that are coupled to or otherwise included in autonomous vehicle 104. For example, one or more sensors 210 include a Light Detection and Ranging (LIDAR) system, a Radio Detection and Ranging (RADAR) system, one or more cameras (e.g., visible spectrum cameras, infrared cameras, etc.), and/or the like. In some non-limiting embodiments or aspects, the sensor data includes data that describes a location of objects within the surrounding environment of autonomous vehicle 104. In some non-limiting embodiments or aspects, one or more sensors 210 collect sensor data that includes data that describes a location (e.g., in 3-D space relative to autonomous vehicle 104) of points that correspond to objects within the surrounding environment of autonomous vehicle 104.

In some non-limiting embodiments or aspects, the sensor data includes a location (e.g., a location in 3-D space relative to the LIDAR system) of a number of points (e.g., a point cloud) that correspond to objects that have reflected a ranging laser. In some non-limiting embodiments or aspects, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments or aspects, map data includes LIDAR point cloud maps associated with a geographic location (e.g., a location in 3-D space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects at the geographic location of the map.

In some non-limiting embodiments or aspects, the sensor data includes a location (e.g., a location in 3-D space relative to the RADAR system) of a number of points that correspond to objects that have reflected a ranging radio wave. In some non-limiting embodiments or aspects, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments or aspects, the RADAR system provides information about the location and/or the speed of an object relative to the RADAR system based on the radio waves.

In some non-limiting embodiments or aspects, image processing techniques (e.g., range imaging techniques, as an example, structure from motion, structured light, stereo triangulation, etc.) can be performed by system 200 to identify a location (e.g., in 3-D space relative to the one or more cameras) of a number of points that correspond to objects that are depicted in images captured by one or more cameras. Other sensors can identify the location of points that correspond to objects as well.

In some non-limiting embodiments or aspects, map database 214 provides detailed information associated with the map, features of the roadway at the geographic location, and information about the surrounding environment of autonomous vehicle 104 for autonomous vehicle 104 to use while driving (e.g., traversing a route, planning a route, determining a motion plan, controlling autonomous vehicle 104, etc.).

In some non-limiting embodiments or aspects, vehicle computing system 106 receives a vehicle pose from localization system 216 based on one or more sensors 210 that are coupled to or otherwise included in autonomous vehicle 104. In some non-limiting embodiments or aspects, localization system 216 includes a LIDAR localizer, a low quality pose localizer, and/or a pose filter. For example, the localization system 216 uses a pose filter that receives and/or determines one or more valid pose estimates (e.g., not based on invalid position data, etc.) from the LIDAR localizer and/or the low quality pose localizer, for determining a map-relative vehicle pose. For example, low quality pose localizer determines a low quality pose estimate in response to receiving position data from positioning system 208 for operating (e.g., routing, navigating, controlling, etc.) autonomous vehicle 104 under manual control (e.g., in a coverage lane, on a coverage driving path, etc.). In some non-limiting embodiments or aspects, LIDAR localizer determines a LIDAR pose estimate in response to receiving sensor data (e.g., LIDAR data, RADAR data, etc.) from sensors 210 for operating (e.g., routing, navigating, controlling, etc.) autonomous vehicle 104 under autonomous control (e.g., in an AV lane, on an AV driving path, etc.).

In some non-limiting embodiments or aspects, vehicle command system 218 includes vehicle commander system 220, navigator system 222, path and/or lane associator system 224, and local route generator 226, that cooperate to route and/or navigate autonomous vehicle 104 at a geographic location. In some non-limiting embodiments or aspects, vehicle commander system 220 provides tracking of a current objective of autonomous vehicle 104, such as, a current service, a target pose, a coverage plan (e.g., development testing, etc.), and/or the like. In some non-limiting embodiments or aspects, navigator system 222 determines and/or provides a route plan (e.g., a route between a starting location or a current location and a destination location, etc.) for autonomous vehicle 104 based on a current state of autonomous vehicle 104, map data (e.g., lane graph, driving paths, etc.), and one or more vehicle commands (e.g., a target pose). For example, navigator system 222 determines a route plan (e.g., a plan, a re-plan, a deviation from a route plan, etc.) including one or more lanes (e.g., current lane, future lane, etc.) and/or one or more driving paths (e.g., a current driving path, a future driving path, etc.) in one or more roadways that autonomous vehicle 104 can traverse on a route to a destination location (e.g., a target location, a trip drop-off location, etc.).

In some non-limiting embodiments or aspects, navigator system 222 determines a route plan based on one or more lanes and/or one or more driving paths received from path and/or lane associator system 224. In some non-limiting embodiments or aspects, path and/or lane associator system 224 determines one or more lanes and/or one or more driving paths of a route in response to receiving a vehicle pose from localization system 216. For example, path and/or lane associator system 224 determines, based on the vehicle pose, that autonomous vehicle 104 is on a coverage lane and/or a coverage driving path, and in response to determining that autonomous vehicle 104 is on the coverage lane and/or the coverage driving path, determines one or more candidate lanes (e.g., routable lanes, etc.) and/or one or more candidate driving paths (e.g., routable driving paths, etc.) within a distance of the vehicle pose associated with autonomous vehicle 104. For example, path and/or lane associator system 224 determines, based on the vehicle pose, that autonomous vehicle 104 is on an AV lane and/or an AV driving path, and in response to determining that autonomous vehicle 104 is on the AV lane and/or the AV driving path, determines one or more candidate lanes (e.g., routable lanes, etc.) and/or one or more candidate driving paths (e.g., routable driving paths, etc.) within a distance of the vehicle pose associated with autonomous vehicle 104. In some non-limiting embodiments or aspects, navigator system 222 generates a cost function for each of the one or more candidate lanes and/or the one or more candidate driving paths that autonomous vehicle 104 may traverse on a route to a destination location. For example, navigator system 222 generates a cost function that describes a cost (e.g., a cost over a time period) of following (e.g., adhering to) one or more lanes and/or one or more driving paths that may be used to reach the destination location (e.g., a target pose, etc.).

In some non-limiting embodiments or aspects, local route generator 226 generates and/or provides route options that may be processed and control travel of autonomous vehicle 104 on a local route. For example, navigator system 222 may configure a route plan, and local route generator 226 may generate and/or provide one or more local routes or route options for the route plan. For example, the route options may include one or more options for adapting the motion of the AV to one or more local routes in the route plan (e.g., one or more shorter routes within a global route between the current location of the AV and one or more exit locations located between the current location of the AV and the destination location of the AV, etc.). In some non-limiting embodiments or aspects, local route generator 226 may determine a number of route options based on a predetermined number, a current location of the AV, a current service of the AV, and/or the like.

In some non-limiting embodiments or aspects, perception system 228 detects and/or tracks objects (e.g., vehicles, pedestrians, bicycles, and the like) that are proximate to (e.g., in proximity to the surrounding environment of) autonomous vehicle 104 over a time period. In some non-limiting embodiments or aspects, perception system 228 can retrieve (e.g., obtain) map data from map database 214 that provides detailed information about the surrounding environment of autonomous vehicle 104.

In some non-limiting embodiments or aspects, perception system 228 determines one or more objects that are proximate to autonomous vehicle 104 based on sensor data received from one or more sensors 210 and/or map data from map database 214. For example, perception system 228 determines, for the one or more objects that are proximate, state data associated with a state of such an object. In some non-limiting embodiments or aspects, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape, such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments or aspects, perception system 228 determines state data for an object over a number of iterations of determining state data. For example, perception system 228 updates the state data for each object of a plurality of objects during each iteration.

In some non-limiting embodiments or aspects, prediction system 230 receives the state data associated with one or more objects from perception system 228. Prediction system 230 predicts one or more future locations for the one or more objects based on the state data. For example, prediction system 230 predicts the future location of each object of a plurality of objects within a time period (e.g., 5 seconds, 10 seconds, 20 seconds, etc.). In some non-limiting embodiments or aspects, prediction system 230 predicts that an object will adhere to the object's direction of travel according to the speed of the object. In some non-limiting embodiments or aspects, prediction system 230 uses machine learning techniques or modeling techniques to make a prediction based on state data associated with an object.

In some non-limiting embodiments or aspects, motion planning system 232 determines a motion plan for autonomous vehicle 104 based on a prediction of a location associated with an object provided by prediction system 230 and/or based on state data associated with the object provided by perception system 228. For example, motion planning system 232 determines a motion plan (e.g., an optimized motion plan) for autonomous vehicle 104 that causes autonomous vehicle 104 to travel relative to the object based on the prediction of the location for the object provided by prediction system 230 and/or the state data associated with the object provided by perception system 228.

In some non-limiting embodiments or aspects, motion planning system 232 receives a route plan as a command from navigator system 222. In some non-limiting embodiments or aspects, motion planning system 232 determines a cost function for one or more motion plans of a route for autonomous vehicle 104 based on the locations and/or predicted locations of one or more objects. For example, motion planning system 232 determines the cost function that describes a cost (e.g., a cost over a time period) of following (e.g., adhering to) a motion plan (e.g., a selected motion plan, an optimized motion plan, etc.). In some non-limiting embodiments or aspects, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments or aspects, motion planning system 232 determines a cost of following a motion plan. For example, motion planning system 232 determines a motion plan for autonomous vehicle 104 based on one or more cost functions. In some non-limiting embodiments or aspects, motion planning system 232 determines a motion plan (e.g., a selected motion plan, an optimized motion plan, a preferred motion plan, etc.) that minimizes a cost function. In some non-limiting embodiments or aspects, motion planning system 232 provides a motion plan to vehicle controls 240 (e.g., a device that controls acceleration, a device that controls steering, a device that controls braking, an actuator that controls gas flow, etc.) to implement the motion plan.

In some non-limiting embodiments or aspects, motion planning system 232 communicates with local route interpreter 234 and map geometry system 236. In some non-limiting embodiments or aspects, local route interpreter 234 may receive and/or process route options from local route generator 226. For example, local route interpreter 234 may determine a new or updated route for travel of autonomous vehicle 104. As an example, one or more lanes and/or one or more driving paths in a local route may be determined by local route interpreter 234 and map geometry system 236. For example, local route interpreter 234 can determine a route option and map geometry system 236 determines one or more lanes and/or one or more driving paths in the route option for controlling motion of autonomous vehicle 104.

Figure 3:
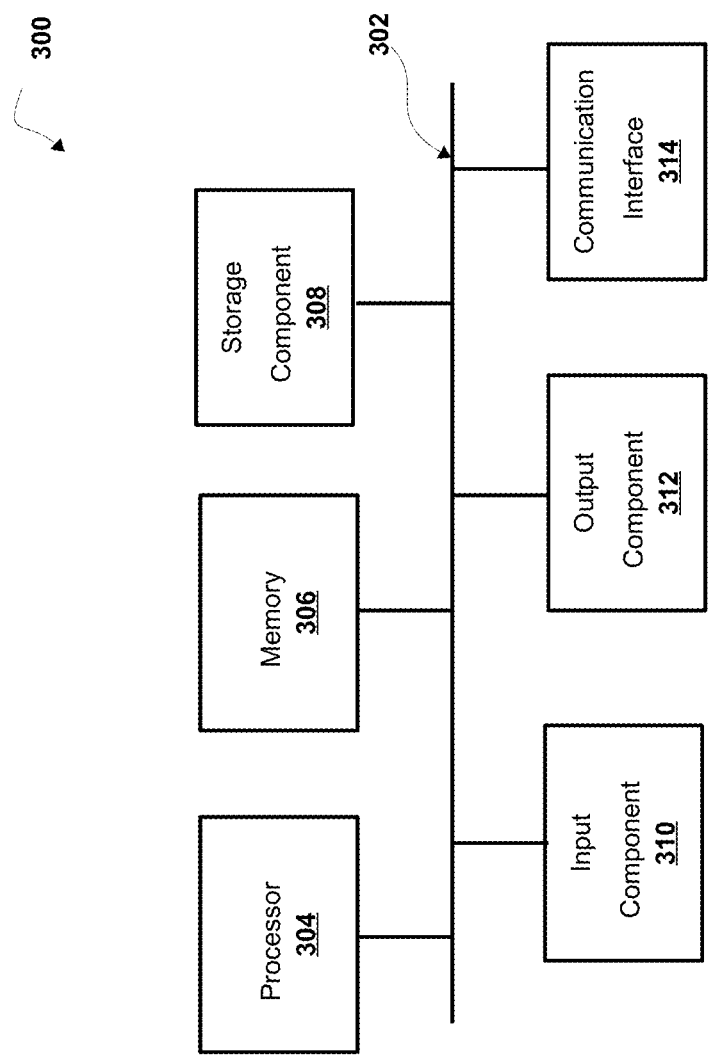
FIG. 3 is a diagram of a non-limiting embodiment or aspect of components of one or more devices and/or one or more systems of FIGS. 1 and 2.

Referring now to FIG. 3, FIG. 3 is a diagram of example components of a device 300. Device 300 can correspond to one or more devices of map generation system 102 and/or one or more devices of (e.g., one or more devices of a system of) autonomous vehicle 104. In some non-limiting embodiments or aspects, one or more devices of map generation system 102 and/or one or more devices of (e.g., one or more devices of a system of) autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments or aspects, processor 304 is implemented in hardware, firmware, or a combination of hardware and firmware. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disc (e.g., a magnetic disc, an optical disc, a magneto-optic disc, a solid state disc, etc.), a compact disc (CD), a digital versatile disc (DVD), a floppy disc, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments or aspects, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
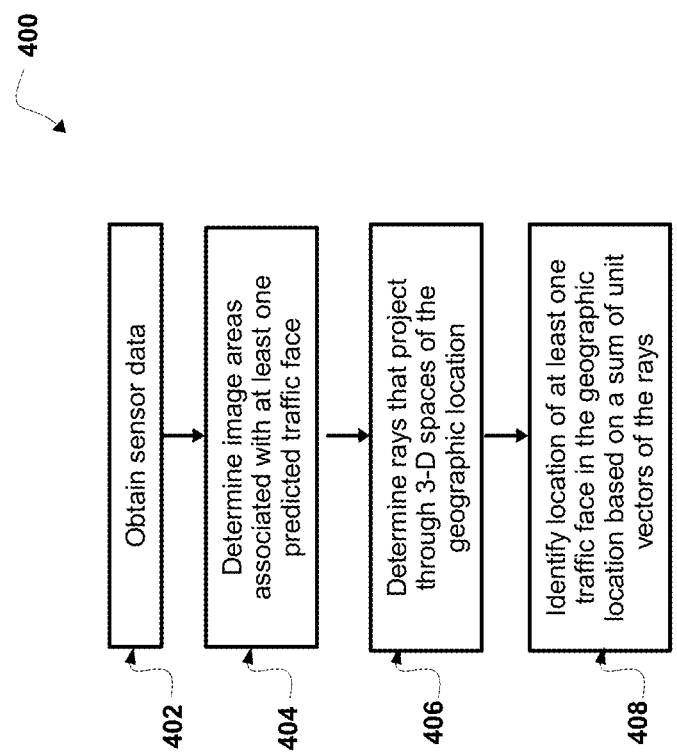
FIG. 4 is a flowchart of a non-limiting embodiment or aspect of a process for identifying a traffic face.

Referring now to FIG. 4, FIG. 4 is a flowchart of a non-limiting embodiment or aspect of a process 400 for detecting a traffic face. In some non-limiting embodiments or aspects, one or more of the steps of process 400 are performed (e.g., completely, partially, etc.) by map generation system 102 (e.g., one or more devices of map generation system 102, etc.). In some non-limiting embodiments or aspects, one or more of the steps of process 400 are performed (e.g., completely, partially, etc.) by another device or a group of devices separate from or including map generation system 102, such as one or more devices of (e.g., one or more devices of a system of) autonomous vehicle 104.

As shown in FIG. 4, at step 402, process 400 includes obtaining sensor data. For example, map generation system 102 obtains sensor data. As an example, map generation system 102 obtains (e.g., receives, retrieves, etc.) sensor data including a plurality of images associated with a geographic location including a roadway, and the plurality of images are associated with a plurality of image capture locations (e.g., a point of origination at the geographic location, such as a point associated with a central area of a camera lens, etc.) at the geographic location.

In some non-limiting embodiments or aspects, the sensor data is collected by a vehicle as it transitions through a sequence of poses while traversing a roadway at a geographic location. As an example, map generation system 102 obtains sensor data collected by autonomous vehicles and/or non-autonomous, human controlled vehicles as the vehicles travel on a roadway in a geographic region. For example, the sensor data may be collected by vehicles (e.g., a map collection vehicle specifically for collecting data for mapping, etc.) during normal autonomy operations (e.g., non-mapping specific operations, etc.). The computing system 106 of autonomous vehicle 104 can obtain sensor data that has been stored in vehicle logs as autonomous vehicle 104 traverses a roadway. For example, the sensor data may include sensor data (e.g., LIDAR point clouds, video logs from the cameras, radar images, camera images, etc.) from one or more vehicle logs associated with one or more autonomous vehicles 104 that are collected, stored, and/or aggregated together by map generation system 102.

In some non-limiting embodiments or aspects, map generation system 102 may generate the plurality of images by sampling (e.g., extracting, querying, and/or determining a key frame, etc.) the sensor data at an interval (e.g., a predetermined interval, such as each one meter interval, two meter, etc.) of an autonomous vehicle log (e.g., log data associated with a chunk of roadway such as camera images, etc.). For example, the plurality of images may be stored, generated, and/or received as a chunk of sensor data (e.g., a plurality of chunks, a vehicle log for one or more traversals of a roadway, etc.) associated with a length of a roadway in the geographic region. Depending on the length of the roadway, map generation system 102 may further divide the chunk of sensor data into one or more chunks (e.g., chunks of smaller size geospatially, etc.). For example, the map generation system 102 generates sensor data associated with a predetermined area of the roadway (e.g., a 10 cm by 10 cm segment bounded by an x-value and y-value in a map, etc.).

In some non-limiting embodiments, map generation system 102 obtains image data having a plurality of elements associated with an image (e.g., cells, pixels, matrices, etc.). For example, map generation system 102 receives the image data associated with the image and/or the image data from an image database based on a request (e.g., a request or query for a log chunk, etc.) that is divided into a plurality of elements. Based on the request, map generation system 102 extracts the one or more chunks by opening a log for each chunk and records the metadata (e.g., writes out the log metadata, etc.) associated with each of the images that are to be used in the inference stage. As an example, the metadata can include a log identifier, a camera name, an image time (e.g., time of capture, etc.), or metadata about the map (e.g. a submap, location coordinates, etc.).

In some non-limiting embodiments, map generation system 102 extracts or generates from the sensor data an image of the road that includes Light Detection and Ranging (LIDAR) image data associated with a LIDAR image of the road and/or Red Green Blue (RGB) image data (e.g., truecolor image data) associated with a wide angle image of the road. Alternatively, the sensor data may include black and white image data associated with a black and white image of the road. The plurality of images extracted from the sensor data may include one or more angled camera images (e.g., wide angle camera images from positions around the vehicle at the 8:00, 10:00, 12:00, 2:00, and 4:00 locations, etc.).

In some non-limiting embodiments or aspects, map generation system 102 may obtain image data having an image of a traffic face (e.g., one or more automatically-operated colored lights (e.g., red, amber, and/or green, etc.), signs (e.g., a traffic sign, road signage, etc.), or other signals, etc.) for controlling traffic at a road junction, an intersection, or a crosswalk in a geographic location (e.g., geographic location image data associated with an image of a geographic location) including one or more roads. For example, the plurality of elements of the map data are associated with an image of a road having one or more traffic faces (e.g., an image of a road in a geographic location, an image of a geographic location that includes the road an image of the road that includes data associated with operating a vehicle on the road such as a road map, an image of the road that includes features of the road, such as a feature map, an image of a lane of the road located in a map, etc.).

In some non-limiting embodiments or aspects, during the one or more traversals, sensor data for one or more roadway features of a roadway may also be collected, such as changes in elevation, z-values, or other physical phenomena in an area surrounding a vehicle as it traverses a roadway. As an example, the sensor data can include sensor parameters associated with the roadway, such as, x-value coordinates (e.g., a latitude of a vehicle, etc.), y-value coordinates (e.g., a longitude of a vehicle, etc.), z-value coordinates (e.g., an elevation, height, or altitude of a vehicle relative to the ground and/or sea level, etc.), heading (e.g., a yaw, etc.), pitch of the vehicle (e.g., a pitch angle, grade, or incline that is positive for upward movement of the vehicle nose and negative for downward movement of the vehicle nose, etc.), pitch rate, longitudinal speed, longitudinal acceleration, yaw, yaw rate, latitudinal speed, latitudinal acceleration, roll, roll rate, and/or the like. The sensor data in the vehicle logs can be stored locally and/or sent to map generation system 102 to be processed (e.g., stored, chunked, aggregated, etc.).

As shown in FIG. 4, at step 404, process 400 includes determining image areas associated with at least one predicted traffic face. For example, map generation system 102 determines images associated with the at least one predicted traffic face. As an example, map generation system 102 determines in a subset of images of the plurality of images, a plurality of image areas having the at least one predicted traffic face.

In some non-limiting embodiments or aspects, map generation system 102 determines the predicted traffic face based on the sensor data. For example, map generation system 102 determines, in a subset of images, the plurality of image areas associated with the at least one predicted traffic face by applying an algorithm to the plurality of images.

In some non-limiting embodiments or aspects, map generation system 102 can apply a filtration algorithm to the plurality of images to determine the plurality of image areas, which distinguishes traffic faces from other objects (e.g., cars driving down the road, features of a roadway, objects of a roadway, etc.) in the subset of images. For example, map generation system 102 can generate, train, and/or process an image detector model (e.g., a LiCNN detector, etc.) on each image (e.g., each LIDAR sweep, each camera frame in a video log, etc.) across an entire location or time series of a log of sensor data for the geographic location. For each traffic face detection, map generation system 102 can project a 3-D bounding box of the traffic face detection into the orthonormal top-down view, and accumulate the traffic face detections across all images, across all logs of sensor data for that geographic location in space, and across any subset of images of the plurality of images (e.g., any selection of images from a particular log, any logs that cover a geospatial location, etc.). As an example, map generation system 102 can apply learnable parameters (e.g., a weight, a bias, etc.) such as probabilities or confidence scores to the output of the model which may ensure that the data accurately reflects the confidence level of the model.

In some non-limiting embodiments or aspects, map generation system 102 performs an estimation of traffic face regions based on an accumulation (e.g., aggregation, etc.) of all of the 3-D bounding boxes of the traffic face algorithm. Along with their associated camera and image metadata, the 3-D bounding boxes are used to estimate the traffic face regions (e.g., areas of one or more images where traffic faces are expected, identified, predicted, detected, determined, etc.). As an example, a traffic face detection in an individual frame may include noise and other inaccuracies that lower the confidence level, or may include a false negative traffic face detection, a false positive traffic face detection (e.g., a misplaced bounding box that the model predicts, etc.), but when aggregated, the accumulation of true or accurate observations over all of the passes (e.g., traversals) through the plurality of images will correlate (e.g., strongly correlate, etc.) with an expected traffic face, while the false positive observations will not be correlated (e.g., strongly correlated).

In some non-limiting embodiments or aspects, map generation system 102 can adjust (e.g., alter, etc.) the images prior to performing an inference. As an example, map generation system 102 may provide white balancing on the images and/or rectify the images using the virtual camera distortion parameters.

In some non-limiting embodiments or aspects, map generation system 102 generates one inference process per chunk, per camera, for all of the wide-angle cameras on autonomous vehicle 104. For example, map generation system 102 performs the inferences on each key frame in any of the generated inference processes. The key framing may be performed every 1 meter along the given section of the log (e.g., predetermined chunks that are generated, etc.). For any image, the output bounding boxes may be stored (e.g., saved for the next stage in the pipeline, etc.).

Further details regarding non-limiting embodiments of step 404 of process 400 are provided below with regard to FIG. 5.

As shown in FIG. 4, at step 406, process 400 includes determining rays that project through 3-D spaces of the geographic location. For example, map generation system 102 determines a plurality of rays that project through 3-D spaces of the geographic location. As an example, map generation system 102 determines a plurality of rays that project through 3-D spaces of the geographic location associated with the plurality of image areas from a subset of image capture locations of the plurality of image capture locations associated with the subset of images. Based on the plurality of rays in the one or more predicted traffic faces (e.g., at least two rays that originate from the subset of image capture locations associated with the subset of images, etc.), for example, map generation system 102 determines a vector field heatmap to localize a predicted traffic face image of a plurality of images by generating a 3-D estimation for position.

In some non-limiting embodiments or aspects, map generation system 102 can triangulate a 3-D position by projecting a plurality of rays in the camera projection space into a shared Cartesian frame (e.g., a frame with a coordinate system that specifies each point uniquely in a plane by a set of numerical coordinates, etc.) to determine an area of nearest overlap between the plurality of rays. For example, map generation system 102 determines a ray that projects through 3-D spaces (e.g., a 3-D grid of voxels with the values of length, width, depth, etc.) of the geographic location associated with the plurality of image areas. By determining a ray projection into 3-D space associated with many image areas of the plurality of image areas, map generation system 102 can determine a plurality of rays (e.g., one or more rays, a subset of rays, etc.) that project through a grid of voxels (e.g., a 3-D point in space) to indicate an area of a traffic face. As an example, a ray may intersect with a plurality of voxels of the grid of voxels along the projection line between the image capture location and the image area.

In some non-limiting embodiments or aspects, map generation system 102 projects the predicted bounding boxes into real space along the plurality of rays which travel from the camera through the centroid of the bounding box (e.g., center of the traffic face, etc.) and beyond the bounds of the submap extents. As an example, map generation system 102 determines the position of the bounding box based on the subset of rays that project into and/or through a 3-D space of the geographic location associated with the bounding box (e.g., a predicted traffic face, an estimated traffic face location, etc.).

In some non-limiting embodiments or aspects, map generation system 102 determines a unit vector associated with a vehicle observation (e.g., an image capture taken from a vehicle, etc.) for the subset of rays (e.g., each ray of the subset of rays, etc.). For example, map generation system 102 determines a unit vector for any ray in 3-D space between a starting point of the image capture location and an ending point of the centroid of the bounding box.

As shown in FIG. 4, at step 408, process 400 includes identifying a location of at least one traffic face in the geographic location based on a sum of unit vectors of the rays. For example, map generation system 102 identifies a location of at least one traffic face in the geographic location based on a sum of unit vectors associated with the rays. As an example, map generation system 102 identifies at least one location of at least one traffic face in the geographic location based on a sum of unit vectors of the plurality of rays that project through the 3-D spaces of the geographic location at the at least one location of a traffic face. In some non-limiting embodiments or aspects, map generation system 102 identifies a plurality of locations of a plurality of respective traffic faces in the geographic location based on a sum of unit vectors of the plurality of rays that project through the 3-D spaces of the geographic location at the at least one location of the traffic face.

In some non-limiting embodiments or aspects, map generation system 102 generates a vector sum of the unit vectors (or a subset of unit vectors, etc.) based on the rays (e.g., oriented along the rays, etc.) passing through a given voxel. As an example, map generation system 102 compares a threshold (e.g., a predefined threshold, etc.) to a vector sum, such as, an aggregate of the vector field over any bounding boxes generated in the plurality of images determined by the image detector model. The vector sum may provide the count of all of the rays passing through a given voxel and may be used by map generation system 102 to determine if a voxel is associated with an image area (e.g., a predicted traffic face, etc.). The vector field may be determined at any voxel of the grid of voxels, by incrementing a sum of the unit vectors (e.g., a vector generated or associated with the ray formed by a discrete vehicle observation, etc.) projecting through the voxel. In some non-limiting embodiments or aspects, a voxel having a traffic face (e.g., an image area, etc.) in a 3-D space may include significantly more rays which pass through as compared to any voxels that may not contain a traffic face, a voxel having a traffic face thereby having a larger vector field.

In some non-limiting embodiments or aspects, map generation system 102 determines the at least one location of at least one traffic face from a plurality of locations of a plurality of traffic faces satisfying a threshold value associated with the sum of the unit vectors of the plurality of rays that project through the 3-D spaces of the geographic location at the at least one location of the traffic face. For example, map generation system 102 determines the sum of the unit vectors of the plurality of rays by summing any vectors that project through the 3-D spaces.

In some non-limiting embodiments or aspects, map generation system 102 determines a magnitude of the sum of the unit vectors, as an example, by summing any vector that is associated with the plurality of rays that project through the 3-D spaces of the geographic location at the at least one location of the traffic face.

In some non-limiting embodiments or aspects, map generation system 102 generates a 2-D space (e.g., a region of a traffic face, a traffic face region, etc.) of the at least one location of at least one traffic face in the geographic location. For example, in some non-limiting embodiments, map generation system 102 generates the traffic face region of the traffic face by maximizing a magnitude of the unit vectors for any vectors at a point in the traffic face region of the traffic face in a z-direction. As an example, map generation system 102 determines a z-direction for the vector field at any point having coordinates in an x-direction and a y-direction. For example, map generation system 102 determines a vector of the vector field with a greatest magnitude along a z-direction of the vector field.

In some non-limiting embodiments or aspects, map generation system 102 may identify a traffic face by generating a traffic face heatmap based on the traffic face regions by generating contours (e.g., contour lines, etc.) around the 2-D space based on a maximum value of a heatmap (e.g., at ⅓ the maximum value of the heatmap, etc.). As an example, map generation system 102 may generate a traffic face region including a 2-D boundary in the map. In an example, each generated traffic face region may include a 2-D boundary in the map. In some non-limiting embodiments or aspects, map generation system 102 computes a characteristic orientation of the traffic face region using an average of the orientations of the elements (e.g., pixels, cells, etc.) in the given traffic face region, as well as a characteristic height using the average elevation of the points selected in the 2-D vector field.

In some non-limiting embodiments or aspects, map generation system 102 determines the traffic face regions to identify areas (e.g., image areas, geographical regions, etc.) in which it is likely a traffic face exists. In some non-limiting embodiments or aspects, map generation system 102 may apply further filtering to remove traffic face regions having a contour that is smaller than a threshold (e.g., 1 m$^2$ due to the vector field which is defined with the distance between two points as 1 m, etc.). Within the valid contours, the mean vector field orientation and height of the center are calculated, which correspond to the estimated normal vector of the traffic face and traffic face height, respectively.

In some non-limiting embodiments or aspects, map generation system determines a height associated with a traffic face region. As an example, map generation system 102 determines a height based on a characteristic height of the traffic face region using an average of the elevation of any points in the 2-D vector field. In another example, map generation system 102 determines a characteristic orientation of the traffic face region using an average of the orientations of the plurality of elements in the traffic face region.

In some non-limiting embodiments or aspects, map generation system 102 may obtain or generate one or more probability maps including a heatmap (e.g., a 2-D heatmap, a 2-D heatmap of cloud points representing a feature of a road, a normalized heatmap, etc.) associated with the traffic face of a road in the geographic area. As an example, a heatmap may include a value (e.g., a number between 0-255, etc.) of a color of each element (e.g., a pixel, a cell, etc.) in an image of the geographic location. In some non-limiting embodiments or aspects, the value of the color may vary among shades black, white, red, green, and/or blue to indicate a probability of a traffic face (e.g., an intensity of a color such as black, white, red, green, blue, etc.) in the image of the geographic location. In some non-limiting embodiments or aspects, map generation system 102 generates the heatmap having an intensity of the color associated with a homogenous area of a geographic location associated with a road. For example, map generation system 102 may generate a heatmap for a lane of a roadway (e.g., a parking lane, a travel lane, a road edge boundary, a ground surface, etc.) in the geographic location based on the intensity of the color being the same in the portion of the geographic location that includes the traffic face.

In some non-limiting embodiments or aspects, map generation system 102 may obtain or generate a map layer based on an orthonormal top-down camera image (e.g., a synthesized Red Green Blue (RGB) image) of a roadway including a traffic face in the geographic location. In some non-limiting embodiments or aspects, map generation system 102 obtains or generates a map of a roadway including a traffic face in an orthonormal top-down camera image based on identifying the traffic face. For example, map generation system 102 may obtain an orthonormal top-down image of a roadway including a traffic face to overlay traffic face imagery in an area corresponding to the geographic location of a traffic face.

In some non-limiting embodiments or aspects, map generation system 102 may use back-projection of the traffic faces from a map against each image to determine those bounding boxes that do not match. As an example, map generation system 102 may generate an image of the traffic face with a back-projection of the map to show the difference between the location and/or the orientation of the traffic face in the at least one location with respect to a labeled traffic face (e.g., a mapped traffic face, etc.).

In some non-limiting embodiments or aspects, map generation system 102 provides the at least one location of a traffic face to autonomous vehicle 104. In some non-limiting embodiments or aspects, map generation system 102 may detect the at least one location of a traffic face having left turning arrows on the far left of an intersection, areas having a wide road with a limited view of that traffic face in the camera, and/or the like.

Further details regarding non-limiting embodiments of step 408 of process 400 are provided below with regard to FIG. 5.

Figure 5:
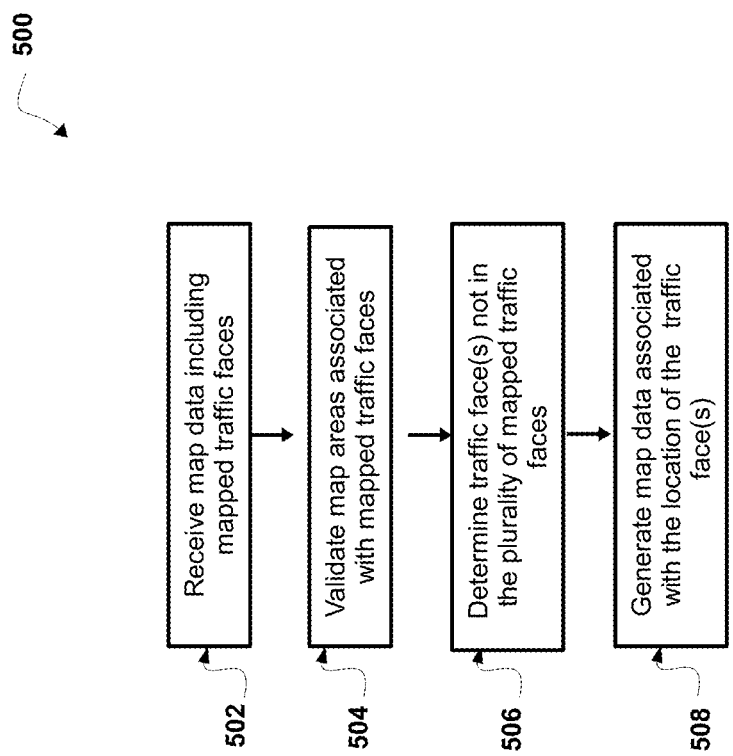
FIG. 5 is a flowchart of a non-limiting embodiment or aspect of a process for identifying a traffic face.

Referring now to FIG. 5, FIG. 5 is a flowchart of a non-limiting embodiment or aspect of a process 500 for detecting a missing traffic face. In some non-limiting embodiments or aspects, one or more of the steps of process 500 are performed (e.g., completely, partially, etc.) by map generation system 102 (e.g., one or more devices of map generation system 102, etc.). In some non-limiting embodiments or aspects, one or more of the steps of process 500 are performed (e.g., completely, partially, etc.) by another device or a group of devices separate from or including map generation system 102, such as one or more devices of (e.g., one or more devices of a system of) autonomous vehicle 104.

As shown in FIG. 5, at step 502, process 500 includes receiving map data including mapped traffic faces. For example, map generation system 102 receives map data including mapped traffic faces. As an example, map generation system 102 receives map data associated with a map of the geographic location including a plurality of mapped traffic faces.

In some non-limiting embodiments or aspects, map generation system 102 determines a plurality of map areas of the geographic location including at least one mapped traffic face of the plurality of mapped traffic faces. For example, map generation system 102 generates or determines a set of traffic faces in a map (e.g., a labeled traffic face, a mapped traffic face, etc.) having a geographic location, a mapped height, and an orientation.

As shown in FIG. 5, at step 504, process 500 includes validating map areas associated with mapped traffic faces. For example, map generation system 102 identifies map areas associated with mapped traffic faces. As an example, map generation system 102 validates the at least one location of the traffic face by verifying at least one map area of the plurality of map areas includes the at least one location of the traffic face.

In some non-limiting embodiments or aspects, map generation system 102 verifies at least one map area (e.g., a labeled area in a map, a marked area of a map production system, etc.) of a plurality of map areas based on the at least one map area including the at least one location of at least one traffic face. As an example, map generation system 102 may apply a filtration step (e.g., back-projection, etc.) to the image areas, which distinguishes static objects (e.g., mapped traffic faces, etc.) from predicted traffic faces in the subset of images. For example, map generation system 102 compares a map area of the plurality of map areas to a traffic face region having a traffic face and determines if the traffic face region (e.g., the at least one location of the traffic face, etc.) corresponds to a mapped traffic face. In some non-limiting embodiments or aspects, a traffic face may be determined to correspond to a mapped traffic face, if map generation system 102 determines a mapped traffic face is included within the traffic face region (e.g., at least a portion of the mapped traffic face is located within a given buffer around the traffic face region, the mapped traffic face is located within a threshold of the traffic face region, etc.), includes a mapped height within the traffic face region (e.g., the mapped traffic face is within a given threshold of the height of the traffic face region, etc.), and/or includes an orientation of the traffic face region (e.g., the mapped traffic face is oriented within a threshold of the orientation associated with the traffic face region, etc.). For example, any traffic face regions that satisfy these criteria (e.g., a subset of these criteria, etc.) may be considered a traffic face region where map generation system 102 predicts a traffic face to exist.

As shown in FIG. 5, at step 506, process 500 includes determining traffic faces not in the plurality of mapped traffic faces. For example, map generation system 102 determines a missing mapped traffic face from the plurality of mapped traffic faces. As an example, map generation system 102 verifies the plurality of map areas do not include the at least one location of the traffic face. For example, during validation of traffic faces, map generation system 102 may determine at least one traffic face having no map area in the plurality of map areas associated with the at the at least one location of at least one traffic face. In some non-limiting embodiments or aspects, map generation system 102 determines any traffic face regions that do not meet the criteria for verifying a traffic face (e.g., a subset of these criteria, etc.) may be considered a traffic face region where map generation system 102 estimates there to be a missing traffic face from the map (e.g., a missing mapped traffic face, etc.).

In some non-limiting embodiments or aspects, map generation system 102 compares the generated traffic face regions to those that are in the map to determine which of the traffic face regions correspond to traffic faces missing from the map. Map generation system 102 compares each traffic face region to the set of labeled traffic faces in a map and considers that a traffic face region corresponds to a labeled traffic face in the map if a traffic face lies within the traffic face region. In some non-limiting embodiments or aspects, a traffic face may be determined not to correspond to a mapped traffic face, if map generation system 102 determines a mapped traffic face is not within the traffic face region, does not include a mapped traffic face with a height within the traffic face region, and/or does not include a traffic face with an orientation of the traffic face region (e.g., the mapped traffic face is similarly oriented within a threshold of the orientation associated with the traffic face region, etc.). For example, any traffic face regions that do not satisfy these criteria (e.g., a subset of these criteria, etc.) may be considered a traffic face region missing from the map.

As shown in FIG. 5, at step 508, process 500 includes generating map data associated with the missing mapped traffic face. For example, map generation system 102 generates map data associated with the at least one location of the traffic face for verifying a map area of the traffic face.

In some non-limiting embodiments or aspects, map generation system 102 provides an evidence layer (e.g., the traffic face layer, one or more detected traffic faces, etc.) to provide evidence for human operators for where traffic faces should be drawn in a map of a geographic location. Map generation system 102 may interact with web tools to assist in generating a traffic face in the map by a human. As an example, map generation system 102, in response to the human operator selecting a traffic face region, such as a traffic face region including an orientation, location, height and/or the like of a traffic face, can utilize the traffic face region which represents a traffic face to identify an area, position, or determine additional information. In such an example, inside of an intersection, the human operator might select the traffic face region, and map generation system 102 can use this as input to filter the traffic face and look only at the region of the traffic face. Map generation system 102 may suggest an orientation and location of a traffic face (e.g., based on an average of the orientation of elements in the region, etc.) which the human operator can adjust, or map generation system 102 may return a traffic face region, and the human operator or the web tools may be able to determine the correct traffic face (e.g., determine based on rules, etc.).

In some non-limiting embodiments or aspects, for any of the suspected missing traffic face regions, map generation system 102 generates map data and/or a map image for a map area that provides the necessary information for a map operator to determine if the identified region shows a traffic face and if the traffic face is necessary for the purposes of the maps that are generated. In some non-limiting embodiments or aspects, map generation system determines a height associated with the at least one map area. As an example, map generation system 102 determines a height of the map area of the at least one traffic face to be within a predetermined threshold of a maximum discrepancy associated with the at least one traffic face in the traffic face region. In another example, map generation system 102 determines an orientation of the region of the traffic face within a predetermined threshold of an orientation of the vectors of the vector field associated with the traffic face region. As an example, a maximum discrepancy can be a range (e.g., threshold, etc.) within an upper bound and a lower bound.

Map generation system 102 filters images such that the traffic face region lies in the field of view of the camera image, and there is a predicted bounding box in the vicinity of the generated traffic face region. These images are scored based on the distance between the traffic face region and the camera making the observation, the angle of the camera relative to the orientation of the traffic face region, how centered the projection of the traffic face region is in the image, and how centered the bounding box is in the projection of the traffic face region. Map generation system 102 generates an image showing the width of the traffic face region annotated with the predicted bounding boxes formed by back-projection.

In some non-limiting embodiments or aspects, a traffic face validation report is generated by map generation system 102, which includes information about the traffic faces that are believed to be missing, such as, for example, statistics and metrics on the performance of the model, and images showing the suspected traffic face locations (e.g., images that may be linked to in the validation report).

In some non-limiting embodiments or aspects, for any traffic face region missing from the map, map generation system 102 finds any images of the traffic face that is missing from the map. For example, for any image detection that includes a predicted bounding box associated with a traffic face region missing from the map, a portion (e.g., a slice, etc.) of the traffic face region is taken perpendicular to its orientation and projected into the image. In such an example, if a center point of the traffic face region is within the image, map generation system 102 may determine (e.g., find, etc.) a minimum distance of the center point of any of the predicted bounding boxes to the center point of the traffic face region. From this list, a sorted list may be generated to apply a priority to images including bounding boxes most optimally centered within the traffic face region. In some non-limiting embodiments or aspects, map generation system 102 applies the list by sorting the images according to an optimal viewing angle and bounding box location within the image.

In some non-limiting embodiments or aspects, map generation system 102 generates images for assuring proper location of a traffic face. As an example, map generation system 102 may determine the top two images from the sorted list are selected for displaying in a map production system in order to determine if an identified region is a map area of a missing traffic face. For example, an overhead view of a submap (e.g., map, etc.) may be displayed to highlight a location of any of the traffic faces in the submap. In this overhead view, a location of a suspected traffic face region and the locations and viewing angles of the two selected images may be included. For example, any of the camera images may be displayed with the traffic face region that is not of interest frosted over and the top-down view of the submap, cropped, zoomed, and/or rotated to show a vehicle and the traffic face region. For example, any predicted bounding boxes in the image may be drawn in a first color, while the traffic faces which are overlaid via back-projection may be drawn in a second color.

In some non-limiting embodiments or aspects, map generation system 102 may identify any traffic faces to be labeled and include them in the map production process. In some non-limiting embodiments or aspects, map generation system 102 may identify markers from which to triangulate traffic sections or automate triangulation of sections in a geographic location.

In some non-limiting embodiments or aspects, map production operators may use missing traffic face images to determine whether a traffic face was actually missed or whether a traffic face region was falsely generated, misaligned to the true traffic face, or misplaced.

Referring now to FIGS. 6A-6D, FIGS. 6A-6D are diagrams of an overview of a non-limiting embodiment of an implementation 600 relating to one or more processes disclosed herein. As shown in FIGS. 6A-6D, implementation 600 includes map generation system 602, autonomous vehicle 604 including vehicle computing system 606. In some non-limiting embodiments or aspects, map generation system 602 can be the same or similar to map generation system 102. In some non-limiting embodiments or aspects, autonomous vehicle 604 can be the same or similar to autonomous vehicle 104. In some non-limiting embodiments or aspects, vehicle computing system 606 can be the same or similar to vehicle computing system 106.

Figure 6A:
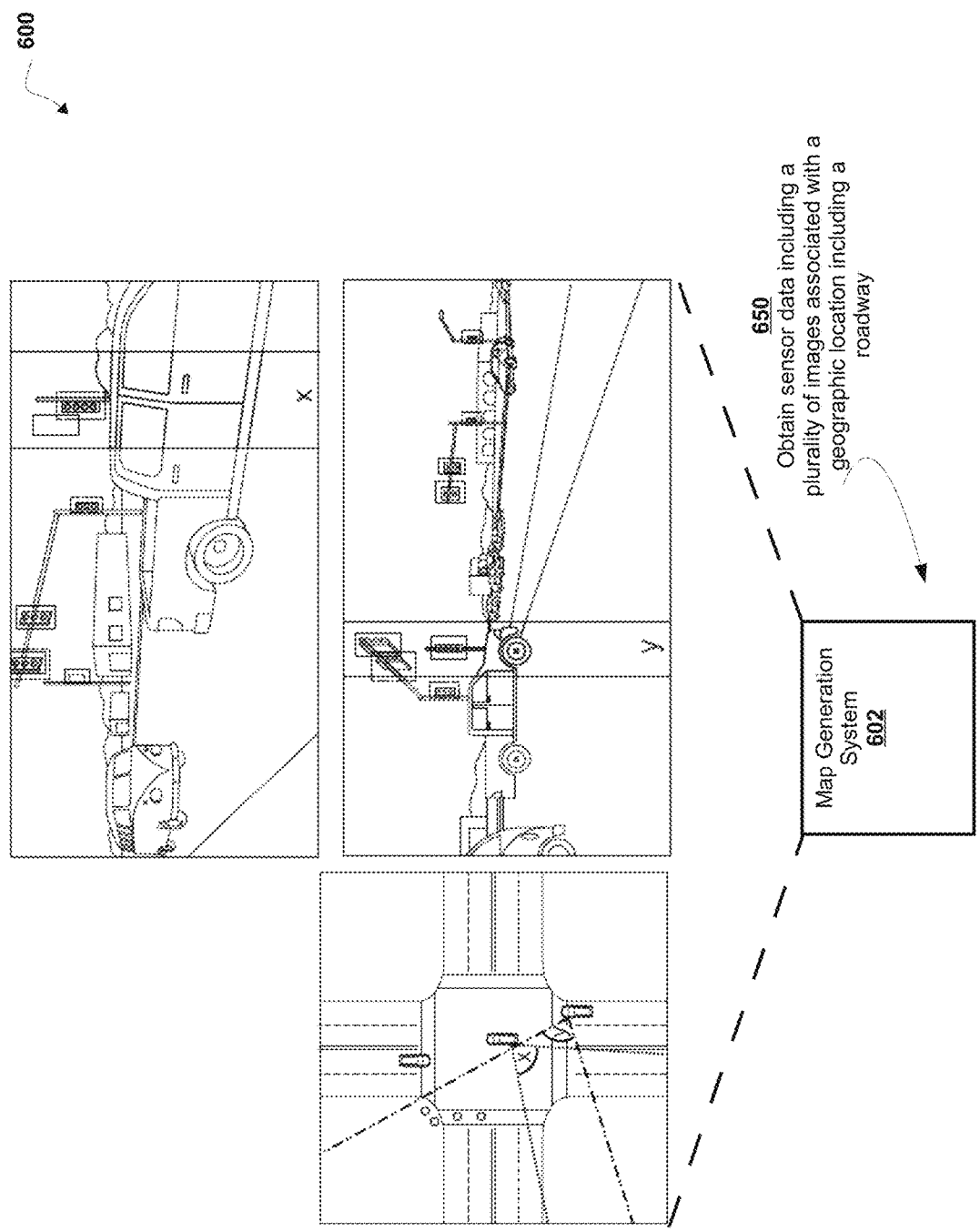

As shown by reference number 650 in FIG. 6A, map generation system 602 obtains sensor data including a plurality of images associated with a geographic location including a roadway. The sensor data includes images that are sampled at an interval (e.g., one or more meters interval along a log or a traffic chunk, extracting from all wide-view cameras (5 cameras: rear left/right, front left/right, front center). The first step is to extract the chunks from an AV map, open the log for each chunk, and then obtain the sensor data or metadata associated with each of the images that are to be used in the inference stage. The metadata for the image includes the log id, the camera name, and the image time, as well as metadata about the map and submap.

In some non-limiting embodiments or aspects, the traffic faces for each submap and all neighbors (e.g., neighbors within one cell, element, submap, etc.) are extracted from the map to be used for back-projection of a geographic area.

As shown in FIG. 6A, a first car is associated with a first camera view x and a second car is associated with a second camera view y. In some non-limiting embodiments or aspects, the first car and the second car collect sensor data while traveling on a roadway. As shown, the first and second car collect sensor data including a camera angle having a line through at least one traffic face. As shown in FIG. 6A, the sensor data is used to create bounding boxes (e.g., detected boundaries are indicated using dots and dashes). In some embodiments, bounding boxes are generated using back-projection in a geographic area associated with a mapped position of a traffic face or other object (e.g., back-projections are indicated in FIG. 6A using solid boxes).

Figure 6B:
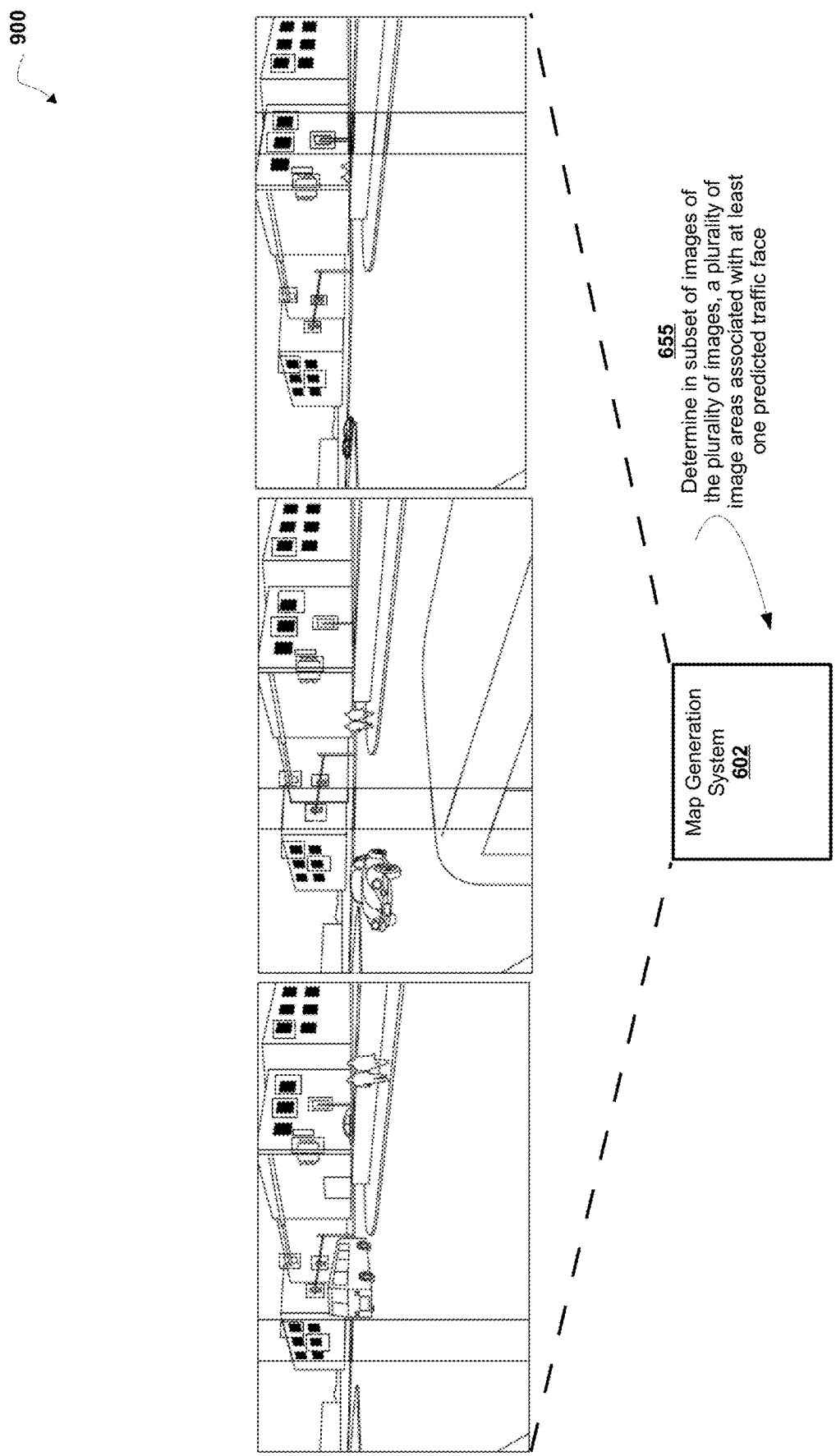

As shown by reference number 655 in FIG. 6B, map generation system 602 determines in a subset of images of the plurality of images, a plurality of image areas associated with at least one predicted traffic face. For example, map generation system 602 determines a plurality of image areas associated with at least one predicted traffic face by determining a geographic region of the traffic face. In some examples, map generation system 602 aggregates (e.g., combines, etc.) each of the predicted bounding boxes, each respective associated camera image and image metadata to determine traffic face predictions in the geographic regions where traffic faces are expected. The traffic face predictions may include false negative traffic faces (e.g., traffic faces that the model misses, etc.) and false positive bounding boxes (e.g., bounding boxes where the model incorrectly predicts a traffic face region, etc.), such as the windows on a building or a traffic sign as shown in FIG. 6B. By aggregating over all of the passes through the submap, accurate predictions of traffic faces are correlated with many true observations, while a false positive observation will not be strongly correlated across runs.

As shown by reference number 660 in FIG. 6C, map generation system 602 determines a plurality of rays that project through 3-D spaces of the geographic location from a subset of image capture locations of the plurality of image capture locations associated with the subset of images. For example, map generation system 102 can triangulate a 3-D position by projecting a plurality of rays in the camera projection space into a shared Cartesian frame (e.g., a frame with a coordinate system that specifies each point uniquely in a plane by a set of numerical coordinates, etc.) to determine an area of nearest overlap between the plurality of rays. As shown in FIG. 6C, map generation system 102 determines an area of a traffic face by aggregating a plurality of rays projecting from a plurality of sensors of a plurality of vehicles (e.g., image capture location, etc.) through a traffic face or image area (e.g., a grid of voxels, a 3-D point in space, etc.).

In some non-limiting embodiments or aspects, map generation system 102 projects the predicted bounding boxes into real space along the plurality of rays which travel from the camera through the centroid of the bounding box (e.g., center of the traffic face, etc.) and beyond the bounds of the submap extents to determine the position of the bounding box. As shown in FIG. 6C, a top-down view of the geographic location includes a resulting vector field. The dots are the mapped locations of traffic faces and the black arrows describe the vector field.

In some non-limiting embodiments or aspects, regions of predicted traffic faces are generated in a 2-dimensional representation of the vector field. For example, a vector field is generated by taking the arg max (e.g., maximizing the points of the vector, etc.) along the z-direction. For example, the vector at the point x, y is the vector with the largest magnitude for all points along the z-axis with the same coordinates x and y. This 2-d vector field is shown in FIG. 6C by the magnitude of the resulting vector.

Figure 6D:
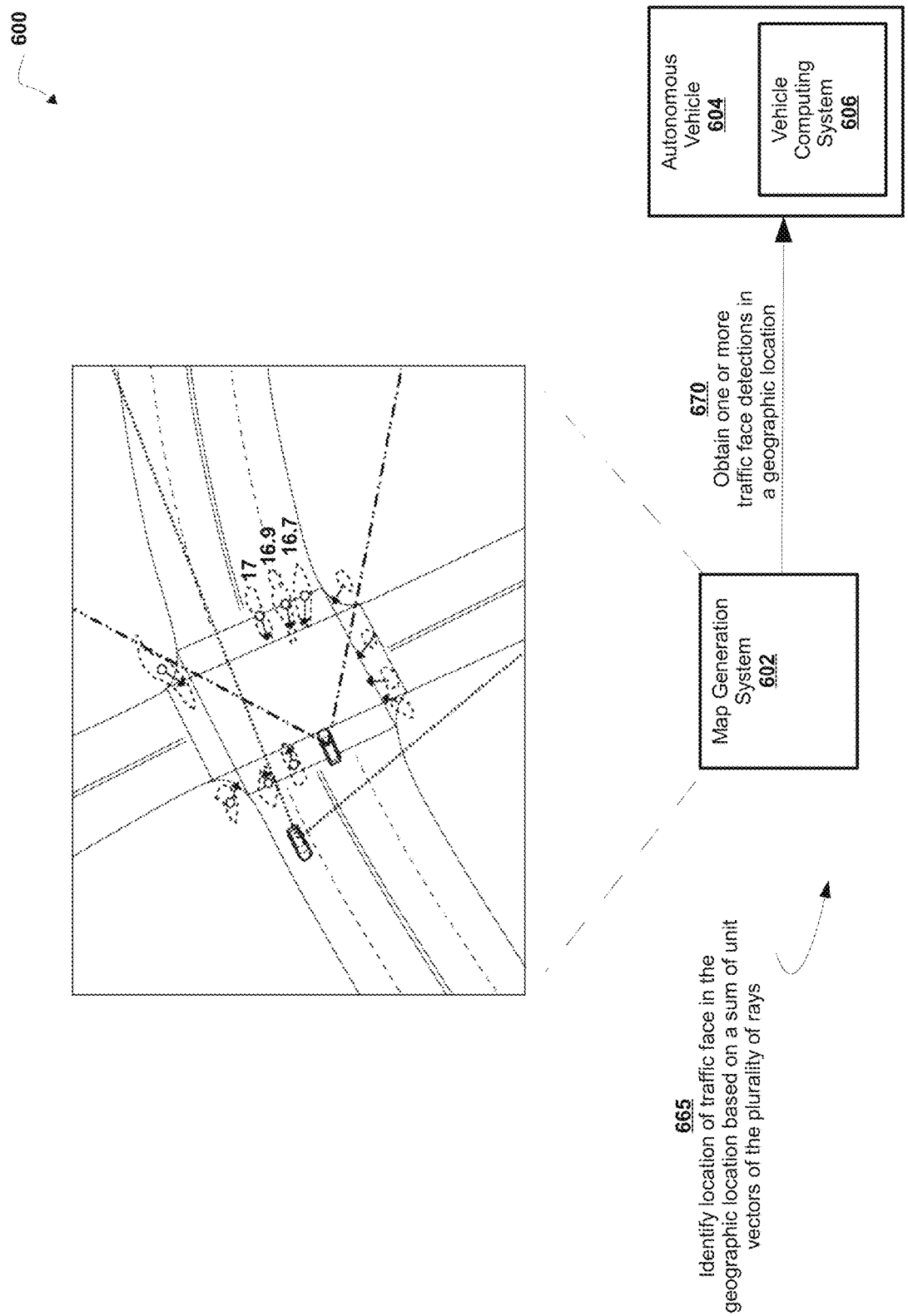

As shown by reference number 665 in FIG. 6D, map generation system 602 identifies at least one location of at least one traffic face in the geographic location based on a sum of unit vectors of the plurality of rays that project through the 3-D spaces of the geographic location at the at least one location of a traffic face. In some non-limiting embodiments or aspects, for example, contouring is applied to the vector field in order to find regions (e.g., areas) in which traffic faces are probable. In some examples, filtering is applied to contours to eliminate small vector fields (e.g., less than a predefined size, such as 1 or 2 meters, etc.) based on the distance between two points. As shown in FIG. 6D, map generation system 602 then determines mean vector field orientation (e.g., estimated traffic face normal) and height (e.g., traffic face height) of the center of the valid contours.

In some non-limiting embodiments or aspects, after regions for proposed traffic faces have been defined, they are compared to the traffic face locations within the submap to identify overlaps. In some examples, for a traffic face to be associated to a region, it must be within a 2-d boundary of the region, must have a normal sufficiently close to the estimated orientation for the region, and must have a height sufficiently close to the estimated height for the region. If there is a region that has no associated traffic faces, that region is considered to be a "missing traffic face region". As shown in FIG. 6D, four regions which do not have a blue dot within them are missing traffic face regions. As an example, these regions correctly identify traffic faces that are in fact missing from the map of the geographic location of the region.

In some non-limiting embodiments or aspects, to determine optimal images to view missing traffic faces, map generation system 602 iterates for each missing traffic face region, the entire submap list of image detections to identify images in which the proposed missing traffic face is shown. In some examples, there are filtering and sorting steps to order the detections by optimal views of the region. For example, for each image detection that has predicted bounding boxes, map generation system 602 projects a slice of the region perpendicular to its orientation into the image. If the center point of the region is within the image, map generation system 602 determines a minimum distance of the center of any of the predicted bounding boxes to the center point of the region. The generated list may be further sorted to give priority to images that have bounding boxes most optimally centered within the region. In another example, map generation system 602 using the list from the above step, sorts the images by optimal viewing angle and bounding box location within the image.

As shown by reference number 670 in FIG. 6D, autonomous vehicle 604 (e.g., vehicle computing system 606, etc.) obtains one or more traffic face detections in a geographic location. For example, autonomous vehicle 604 identifies at least one location of at least one traffic face based on the one or more traffic detections in the geographic location.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
    obtaining, with a computing system comprising one or more processors, sensor data, wherein the sensor data includes a plurality of images associated with a geographic location including a roadway, and wherein the plurality of images are associated with a plurality of image capture locations in the geographic location;
    determining, with the computing system, in a subset of images of the plurality of images, a plurality of image areas associated with at least one predicted traffic face;
    determining, with the computing system, a plurality of rays that project through 3-D spaces of the geographic location associated with the plurality of image areas from a subset of image capture locations of the plurality of image capture locations associated with the subset of images; and
    identifying, with the computing system, at least one location of a traffic face in the geographic location based on a sum of unit vectors of the plurality of rays that project through the 3-D spaces of the geographic location at the at least one location of the traffic face.

2. The computer-implemented method of claim 1, further comprising:
    receiving map data associated with a map of the geographic location including a plurality of mapped traffic faces; and
    determining a plurality of map areas of the geographic location including at least one mapped traffic face of the plurality of mapped traffic faces.

3. The computer-implemented method of claim 2, further comprising:
    validating the at least one location of the traffic face by verifying at least one map area of the plurality of map areas includes the at least one location of the traffic face; or
    determining the plurality of map areas does not include the at least one location of the traffic face, and
    generating map data associated with the at least one location of the traffic face to identify a map area of the traffic face.

4. The computer-implemented method of claim 3, further comprising:
    generating, with the computing system, a 2-D space of the at least one location of the traffic face in the geographic location based on maximizing a magnitude of the sum of the unit vectors of the plurality of rays that project through the 3-D spaces at the at least one location of the traffic face in a z-direction.

5. The computer-implemented method of claim 3, wherein generating the map data of the map further comprises:
    determining a height and an orientation associated with the at least one location of the traffic face, wherein the height is calculated to be within a predetermined threshold of a maximum discrepancy associated with the map data, and wherein the orientation is calculated to be within a predetermined threshold of a traffic face orientation associated with the map data.

6. The computer-implemented method of claim 5, further comprising:
    providing a region of the map area as a selectable factor in the map for indicating a probable location of the traffic face.

7. The computer-implemented method of claim 1, wherein identifying the at least one location of the traffic face further comprises:
    determining the at least one location of the traffic face from a plurality of locations of a plurality of traffic faces satisfying a threshold value associated with the sum of unit vectors of the plurality of rays that project through the 3-D spaces of the geographic location at the at least one location.

8. The computer-implemented method of claim 1, wherein the plurality of rays that project through 3-D spaces of the geographic location associated with the plurality of image areas includes a field of voxels in the geographic location, wherein at least one ray of the plurality of rays that project through 3-D spaces of the geographic location associated with an image area of the plurality of image areas intersects with a plurality of voxels of the field of voxels in the geographic location from an image capture location of the subset of image capture locations associated with the subset of images.

9. A computing system comprising:
one or more processors programmed and/or configured to:
obtain sensor data, wherein the sensor data includes a plurality of images associated with a geographic location including a roadway, and wherein the plurality of images are associated with a plurality of image capture locations in the geographic location;
determine, in a subset of images of the plurality of images, a plurality of image areas associated with at least one predicted traffic face;
determine a plurality of rays that project through 3-D spaces of the geographic location associated with the plurality of image areas from a subset of image capture locations of the plurality of image capture locations associated with the subset of images; and
identify at least one location of a traffic face in the geographic location based on a sum of unit vectors of the plurality of rays that project through the 3-D spaces of the geographic location at the at least one location the traffic face.

10. The computing system of claim 9, wherein the one or more processors are further programmed and/or configured to:
receive map data associated with a map of the geographic location including a plurality of mapped traffic faces; and
determine a plurality of map areas of the geographic location including at least one mapped traffic face of the plurality of mapped traffic faces.

11. The computing system of claim 10, wherein the one or more processors are further programmed and/or configured to:
validate the at least one location of the traffic face by verifying at least one map area of the plurality of map areas includes the at least one location of the traffic face; or
determine the plurality of map areas does not include the at least one location of the traffic face, and
generate map data associated with the at least one location of the traffic face to identify a map area of the traffic face.

12. The computing system of claim 11, wherein the one or more processors are further programmed and/or configured to:
generate a 2-D space of the at least one location of the traffic face in the geographic location based on maximizing a magnitude of the sum of the unit vectors of the plurality of rays that project through the 3-D spaces at the at least one location of the traffic face in a z-direction.

13. The computing system of claim 11, wherein the one or more processors are further programmed and/or configured to:
determine a height and an orientation associated with the at least one location of the traffic face, wherein the height is calculated to be within a predetermined threshold of a maximum discrepancy associated with the map data, and wherein the orientation is calculated to be within a predetermined threshold of a traffic face orientation associated with the map data.

14. The computing system of claim 13, wherein the one or more processors are further programmed and/or configured to:

provide a region of the map area as a selectable factor in the map for indicating a probable location of the traffic face.

15. The computing system of claim 9, wherein the one or more processors are further programmed and/or configured to:
determine the at least one location of the traffic face from a plurality of locations of a plurality of traffic faces satisfying a threshold value associated with the sum of unit vectors of the plurality of rays that project through the 3-D spaces of the geographic location at the at least one location of the traffic face.

16. The computing system of claim 9, wherein the plurality of rays that project through 3-D spaces of the geographic location associated with the plurality of image areas includes a field of voxels in the geographic location, wherein at least one ray of the plurality of rays that project through 3-D spaces of the geographic location associated with an image area of the plurality of image areas intersects with a plurality of voxels of the field of voxels in the geographic location from an image capture location of the subset of image capture locations associated with the subset of images.

17. A computer program product comprising at least one non-transitory computer-readable medium including program instructions that, when executed by at least one processor, cause the at least one processor to:
obtain sensor data, wherein the sensor data includes a plurality of images associated with a geographic location including a roadway, and wherein the plurality of images are associated with a plurality of image capture locations in the geographic location;
determine in a subset of images of the plurality of images, a plurality of image areas associated with at least one predicted traffic face;
determine a plurality of rays that project through 3-D spaces of the geographic location associated with the plurality of image areas from a subset of image capture locations of the plurality of image capture locations associated with the subset of images; and
identify at least one location of a traffic face in the geographic location based on a sum of unit vectors of the plurality of rays that project through the 3-D spaces of the geographic location at the at least one location of the traffic face.

18. The computer program product of claim 17, wherein the program instructions further cause the at least one processor to:
receive map data associated with a map of the geographic location including a plurality of mapped traffic faces; and
determine a plurality of map areas of the geographic location including at least one mapped traffic face of the plurality of mapped traffic faces.

19. The computer program product of claim 18, wherein the program instructions further cause the at least one processor to:
validate the at least one location of the traffic face by verifying at least one map area of the plurality of map areas includes the at least one location of the traffic face; or
determine the plurality of map areas does not include the at least one location of the traffic face, and
generate map data associated with the at least one location of the traffic face for identifying a map area of the traffic face.

20. The computer program product of claim 18, wherein the program instructions further cause the at least one processor to:
- determine a height and an orientation associated with the at least one location of the traffic face, wherein the height is calculated to be within a predetermined threshold of a maximum discrepancy associated with the map data, and wherein the orientation is calculated to be within a predetermined threshold of a traffic face orientation associated with the map data.

* * * * *